United States Patent
Karabinis et al.

(10) Patent No.: US 8,078,101 B2
(45) Date of Patent: *Dec. 13, 2011

(54) SYSTEMS AND METHODS FOR TERRESTRIAL REUSE OF CELLULAR SATELLITE FREQUENCY SPECTRUM IN A TIME-DIVISION DUPLEX AND/OR FREQUENCY-DIVISION DUPLEX MODE

(75) Inventors: Peter D. Karabinis, Cary, NC (US); Gary G. Churan, Annandale, VA (US)

(73) Assignee: ATC Technologies, LLC, Reston, VA (US)

( * ) Notice: Subject to any disclaimer, the term of this patent is extended or adjusted under 35 U.S.C. 154(b) by 89 days.

This patent is subject to a terminal disclaimer.

(21) Appl. No.: 12/604,994

(22) Filed: Oct. 23, 2009

(65) Prior Publication Data

US 2010/0039967 A1 Feb. 18, 2010

Related U.S. Application Data

(63) Continuation of application No. 11/021,077, filed on Dec. 23, 2004, now Pat. No. 7,664,460, which is a continuation-in-part of application No. 10/730,660, filed on Dec. 8, 2003, now Pat. No. 7,593,724, which is a continuation-in-part of application No. 10/074,097, filed on Feb. 12, 2002, now Pat. No. 6,684,057.

(60) Provisional application No. 60/322,240, filed on Sep. 14, 2001.

(51) Int. Cl.
*H04B 7/185* (2006.01)
*H04W 4/00* (2009.01)

(52) U.S. Cl. .................. 455/12.1; 455/427; 455/430

(58) Field of Classification Search .................. 455/12.1, 455/427, 430, 63.1, 63.2, 428, 429, 450, 455/452.2

See application file for complete search history.

(56) References Cited

U.S. PATENT DOCUMENTS 3,710,255 A * 1/1973 Gicca ........................ 455/13.1

(Continued)

FOREIGN PATENT DOCUMENTS

EP 0 506 255 A2 9/1992

(Continued)

OTHER PUBLICATIONS

Ayyagari et al., "A satellite-augmented cellular network concept", *Wireless Networks*, vol. 4, Feb. 1998, pp. 189-198.

(Continued)

*Primary Examiner* — Sonny Trinh

(74) *Attorney, Agent, or Firm* — Myers Bigel Sibley & Sajovec, P.A.

(57) ABSTRACT

A space-based component, such as a satellite, is configured to receive wireless communications from radiotelephones in a satellite footprint over an uplink satellite radiotelephone frequency, and to transmit wireless communications to the radiotelephones over a downlink radiotelephone frequency. An ancillary terrestrial network, that may include one or more ancillary terrestrial components, is configured to transmit wireless communications to, and receive wireless communications from, the radiotelephones over the uplink satellite radiotelephone frequency in a time-division duplex mode. An interference reducer is configured to reduce interference from the wireless communications that are received by the space-based component from the second radiotelephone and/or from the ancillary terrestrial network over the uplink satellite radiotelephone frequency, using the wireless communications that are transmitted by the ancillary terrestrial to, and/or received by the ancillary terrestrial network from, the second radiotelephone over the uplink satellite radiotelephone frequency.

40 Claims, 11 Drawing Sheets

U.S. PATENT DOCUMENTS

| | | |
|---|---|---|
| 4,697,188 A | 9/1987 | Lin |
| 4,901,307 A | 2/1990 | Gilhousen et al. |
| 5,073,900 A | 12/1991 | Mallinckrodt |
| 5,081,703 A * | 1/1992 | Lee .............................. 455/13.1 |
| 5,303,286 A | 4/1994 | Wiedeman |
| 5,339,330 A | 8/1994 | Mallinckrodt |
| 5,394,561 A | 2/1995 | Freeburg |
| 5,446,756 A | 8/1995 | Mallinckrodt |
| 5,448,623 A | 9/1995 | Wiedeman et al. |
| 5,511,233 A | 4/1996 | Otten |
| 5,555,257 A | 9/1996 | Dent |
| 5,584,046 A | 12/1996 | Martinez et al. |
| 5,612,703 A | 3/1997 | Mallinckrodt |
| 5,619,525 A | 4/1997 | Wiedeman et al. |
| 5,631,898 A | 5/1997 | Dent |
| 5,734,678 A | 3/1998 | Paneth et al. |
| 5,761,605 A | 6/1998 | Tawil et al. |
| 5,765,098 A | 6/1998 | Bella |
| 5,812,947 A | 9/1998 | Dent |
| 5,832,379 A | 11/1998 | Mallinckrodt |
| 5,835,857 A | 11/1998 | Otten |
| 5,848,060 A | 12/1998 | Dent |
| 5,852,721 A | 12/1998 | Dillon et al. |
| 5,878,329 A | 3/1999 | Mallinckrodt |
| 5,884,142 A | 3/1999 | Wiedeman et al. |
| 5,907,541 A | 5/1999 | Fairholm et al. |
| 5,926,758 A | 7/1999 | Grybos et al. |
| 5,937,332 A | 8/1999 | Karabinis |
| 5,940,753 A | 8/1999 | Mallinckrodt |
| 5,951,709 A | 9/1999 | Tanaka |
| 5,991,345 A | 11/1999 | Ramasastry |
| 5,995,832 A | 11/1999 | Mallinckrodt |
| 6,011,951 A | 1/2000 | King et al. |
| 6,023,605 A | 2/2000 | Sasaki et al. |
| 6,052,560 A | 4/2000 | Karabinis |
| 6,052,586 A | 4/2000 | Karabinis |
| 6,064,645 A | 5/2000 | Develet, Jr. et al. |
| 6,067,442 A | 5/2000 | Wiedeman et al. |
| 6,072,430 A | 6/2000 | Wyrwas et al. |
| 6,085,094 A | 7/2000 | Vasudevan et al. |
| 6,091,933 A | 7/2000 | Sherman et al. |
| 6,097,752 A | 8/2000 | Wiedeman et al. |
| 6,101,385 A | 8/2000 | Monte et al. |
| 6,108,561 A | 8/2000 | Mallinckrodt |
| 6,111,503 A | 8/2000 | Javitt et al. |
| 6,134,437 A | 10/2000 | Karabinis et al. |
| 6,157,811 A | 12/2000 | Dent |
| 6,157,834 A | 12/2000 | Helm et al. |
| 6,160,994 A | 12/2000 | Wiedeman |
| 6,169,878 B1 | 1/2001 | Tawil et al. |
| 6,198,730 B1 | 3/2001 | Hogberg et al. |
| 6,198,921 B1 | 3/2001 | Youssefzadeh et al. |
| 6,201,967 B1 | 3/2001 | Goerke |
| 6,233,463 B1 | 5/2001 | Wiedeman et al. |
| 6,240,124 B1 | 5/2001 | Wiedeman et al. |
| 6,253,080 B1 | 6/2001 | Wiedeman et al. |
| 6,256,497 B1 | 7/2001 | Chambers |
| 6,324,405 B1 | 11/2001 | Young et al. |
| 6,339,707 B1 | 1/2002 | Wainfan et al. |
| 6,411,609 B1 | 6/2002 | Emmons, Jr. et al. |
| 6,418,147 B1 | 7/2002 | Wiedeman |
| 6,430,391 B1 | 8/2002 | Dent et al. |
| 6,449,461 B1 | 9/2002 | Otten |
| 6,463,279 B1 | 10/2002 | Sherman et al. |
| 6,522,865 B1 | 2/2003 | Otten |
| 6,570,858 B1 | 5/2003 | Emmons, Jr. et al. |
| 6,628,919 B1 | 9/2003 | Curello et al. |
| 6,684,057 B2 | 1/2004 | Karabinis |
| 6,735,437 B2 * | 5/2004 | Mayfield et al. .............. 455/427 |
| 6,775,251 B1 | 8/2004 | Wiedeman et al. |
| 6,785,543 B2 | 8/2004 | Karabinis |
| 6,856,787 B2 | 2/2005 | Karabinis |
| 6,859,652 B2 | 2/2005 | Karabinis et al. |
| 6,879,829 B2 | 4/2005 | Dutta et al. |
| 6,892,068 B2 | 5/2005 | Karabinis et al. |
| 6,937,857 B2 | 8/2005 | Karabinis |
| 6,975,837 B1 | 12/2005 | Santoru |
| 6,999,720 B2 | 2/2006 | Karabinis |
| 7,006,789 B2 | 2/2006 | Karabinis et al. |
| 7,031,702 B2 | 4/2006 | Karabinis et al. |
| 7,039,400 B2 | 5/2006 | Karabinis et al. |
| 7,062,267 B2 | 6/2006 | Karabinis |
| 7,092,708 B2 | 8/2006 | Karabinis |
| 7,113,743 B2 | 9/2006 | Karabinis |
| 7,113,778 B2 | 9/2006 | Karabinis |
| 7,149,526 B2 | 12/2006 | Karabinis et al. |
| 7,155,340 B2 | 12/2006 | Churan |
| 7,174,127 B2 | 2/2007 | Otten et al. |
| 7,181,161 B2 | 2/2007 | Karabinis |
| 7,203,490 B2 | 4/2007 | Karabinis |
| 7,218,931 B2 | 5/2007 | Karabinis |
| 7,295,807 B2 | 11/2007 | Karabinis |
| 7,340,213 B2 | 3/2008 | Karabinis et al. |
| 7,418,236 B2 | 8/2008 | Levin et al. |
| 7,418,263 B2 | 8/2008 | Dutta et al. |
| 7,421,342 B2 | 9/2008 | Churan |
| 7,437,123 B2 | 10/2008 | Karabinis et al. |
| 7,444,170 B2 | 10/2008 | Karabinis |
| 7,447,501 B2 | 11/2008 | Karabinis |
| 7,453,396 B2 | 11/2008 | Levin et al. |
| 7,453,920 B2 | 11/2008 | Churan |
| 7,454,175 B2 | 11/2008 | Karabinis |
| 7,457,269 B1 | 11/2008 | Grayson |
| 7,558,568 B2 | 7/2009 | Karabinis |
| 7,574,206 B2 | 8/2009 | Karabinis |
| 7,577,400 B2 | 8/2009 | Karabinis et al. |
| 7,587,171 B2 | 9/2009 | Evans et al. |
| 7,593,691 B2 | 9/2009 | Karabinis |
| 7,593,724 B2 | 9/2009 | Karabinis |
| 7,593,725 B2 | 9/2009 | Karabinis |
| 7,593,726 B2 | 9/2009 | Karabinis et al. |
| 7,596,111 B2 | 9/2009 | Karabinis |
| 7,599,656 B2 | 10/2009 | Karabinis |
| 7,603,081 B2 | 10/2009 | Karabinis |
| 7,603,117 B2 | 10/2009 | Karabinis |
| 7,606,590 B2 | 10/2009 | Karabinis |
| 7,609,666 B2 | 10/2009 | Karabinis |
| 7,620,394 B2 | 11/2009 | Good et al. |
| 7,623,859 B2 | 11/2009 | Karabinis |
| 7,623,867 B2 | 11/2009 | Karabinis |
| 7,627,285 B2 | 12/2009 | Karabinis |
| 7,634,229 B2 | 12/2009 | Karabinis |
| 7,634,234 B2 | 12/2009 | Karabinis |
| 7,636,546 B2 | 12/2009 | Karabinis |
| 7,636,566 B2 | 12/2009 | Karabinis |
| 7,636,567 B2 | 12/2009 | Karabinis et al. |
| 7,639,981 B2 | 12/2009 | Karabinis |
| 7,653,348 B2 | 1/2010 | Karabinis |
| 7,664,460 B2 | 2/2010 | Karabinis et al. |
| 7,696,924 B2 | 4/2010 | Levin et al. |
| 7,706,746 B2 | 4/2010 | Karabinis et al. |
| 7,706,748 B2 | 4/2010 | Dutta |
| 7,706,826 B2 | 4/2010 | Karabinis |
| 7,738,837 B2 | 6/2010 | Karabinis |
| 7,747,229 B2 | 6/2010 | Dutta |
| 7,751,823 B2 | 7/2010 | Karabinis |
| 7,756,490 B2 | 7/2010 | Karabinis |
| 7,783,287 B2 | 8/2010 | Karabinis |
| 7,792,069 B2 | 9/2010 | Karabinis |
| 7,792,488 B2 | 9/2010 | Karabinis et al. |
| 7,796,985 B2 | 9/2010 | Karabinis |
| 7,796,986 B2 | 9/2010 | Karabinis |
| 7,801,520 B2 | 9/2010 | Karabinis |
| 7,813,700 B2 | 10/2010 | Zheng et al. |
| 7,817,967 B2 | 10/2010 | Karabinis et al. |
| 7,831,201 B2 | 11/2010 | Karabinis |
| 7,831,202 B2 | 11/2010 | Karabinis |
| 7,831,251 B2 | 11/2010 | Karabinis et al. |
| 7,856,211 B2 | 12/2010 | Karabinis |
| 7,890,097 B2 | 2/2011 | Karabinis |
| RE42,261 E | 3/2011 | Karabinis |
| 7,907,893 B2 | 3/2011 | Karabinis et al. |
| 7,917,135 B2 | 3/2011 | Karabinis |
| 7,925,209 B2 | 4/2011 | Karabinis |
| 7,933,552 B2 | 4/2011 | Karabinis et al. |
| 7,953,373 B2 | 5/2011 | Karabinis |
| 7,957,694 B2 | 6/2011 | Karabinis et al. |

| | | |
|---|---|---|
| 7,970,345 B2 | 6/2011 | Cummiskey et al. |
| 7,970,346 B2 | 6/2011 | Karabinis |
| 7,974,176 B2 | 7/2011 | Zheng |
| 7,974,575 B2 | 7/2011 | Karabinis |
| 7,974,619 B2 | 7/2011 | Dutta |
| 7,978,135 B2 | 7/2011 | Churan |
| 7,979,024 B2 | 7/2011 | Zheng |
| 2002/0012381 A1 | 1/2002 | Mattisson et al. |
| 2002/0122408 A1 | 9/2002 | Mullins |
| 2002/0146979 A1 | 10/2002 | Regulinski et al. |
| 2002/0168973 A1 | 11/2002 | Dent et al. |
| 2002/0177465 A1 | 11/2002 | Robinett |
| 2003/0003815 A1 | 1/2003 | Yamada |
| 2003/0149986 A1 | 8/2003 | Mayfield et al. |
| 2004/0018837 A1 | 1/2004 | Mayfield et al. |
| 2004/0072539 A1 | 4/2004 | Monte et al. |
| 2004/0095907 A1 | 5/2004 | Agee et al. |
| 2004/0102156 A1 | 5/2004 | Loner |
| 2004/0121727 A1 | 6/2004 | Karabinis |
| 2004/0203393 A1 | 10/2004 | Chen |
| 2004/0240525 A1 | 12/2004 | Karabinis et al. |
| 2005/0041619 A1 | 2/2005 | Karabinis et al. |
| 2005/0090256 A1 | 4/2005 | Dutta |
| 2005/0118948 A1 | 6/2005 | Karabinis et al. |
| 2005/0136836 A1 | 6/2005 | Karabinis et al. |
| 2005/0164700 A1 | 7/2005 | Karabinis |
| 2005/0164701 A1 | 7/2005 | Karabinis et al. |
| 2005/0181786 A1 | 8/2005 | Karabinis et al. |
| 2005/0201449 A1 | 9/2005 | Churan |
| 2005/0239399 A1 | 10/2005 | Karabinis |
| 2005/0260947 A1 | 11/2005 | Karabinis et al. |
| 2005/0260948 A1 | 11/2005 | Regulinski et al. |
| 2005/0260984 A1 | 11/2005 | Karabinis |
| 2005/0272369 A1 | 12/2005 | Karabinis et al. |
| 2006/0094420 A1 | 5/2006 | Karabinis |
| 2006/0135058 A1 | 6/2006 | Karabinis |
| 2006/0135070 A1 | 6/2006 | Karabinis |
| 2006/0165120 A1 | 7/2006 | Karabinis |
| 2006/0194576 A1 | 8/2006 | Karabinis et al. |
| 2006/0205347 A1 | 9/2006 | Karabinis |
| 2006/0205367 A1 | 9/2006 | Karabinis |
| 2006/0211452 A1 | 9/2006 | Karabinis |
| 2006/0252368 A1 | 11/2006 | Karabinis |
| 2007/0010246 A1 | 1/2007 | Churan |
| 2007/0021059 A1 | 1/2007 | Karabinis et al. |
| 2007/0021060 A1 | 1/2007 | Karabinis et al. |
| 2007/0037514 A1 | 2/2007 | Karabinis |
| 2007/0072545 A1 | 3/2007 | Karabinis et al. |
| 2007/0099562 A1 | 5/2007 | Karabinis et al. |
| 2007/0123252 A1 | 5/2007 | Tronc et al. |
| 2007/0129019 A1 | 6/2007 | Otten et al. |
| 2007/0192805 A1 | 8/2007 | Dutta et al. |
| 2007/0243866 A1 | 10/2007 | Karabinis |
| 2007/0281612 A1 | 12/2007 | Benjamin et al. |
| 2007/0293214 A1 | 12/2007 | Ansari et al. |
| 2008/0008264 A1 | 1/2008 | Zheng |
| 2008/0032671 A1 | 2/2008 | Karabinis |
| 2008/0113666 A1 | 5/2008 | Monte et al. |
| 2008/0119190 A1 | 5/2008 | Karabinis |
| 2008/0160993 A1 | 7/2008 | Levin et al. |
| 2008/0182572 A1 | 7/2008 | Tseytlin et al. |
| 2008/0214207 A1 | 9/2008 | Karabinis |
| 2008/0268836 A1 | 10/2008 | Karabinis et al. |
| 2009/0011704 A1 | 1/2009 | Karabinis |
| 2009/0029696 A1 | 1/2009 | Karabinis |
| 2009/0042509 A1 | 2/2009 | Karabinis et al. |
| 2009/0075645 A1 | 3/2009 | Karabinis |
| 2009/0088151 A1 | 4/2009 | Karabinis |
| 2009/0137203 A1 | 5/2009 | Karabinis et al. |
| 2009/0156154 A1 | 6/2009 | Karabinis et al. |
| 2009/0170427 A1 | 7/2009 | Karabinis |
| 2009/0186622 A1 | 7/2009 | Karabinis |
| 2009/0296628 A1 | 12/2009 | Karabinis |
| 2009/0305697 A1 | 12/2009 | Karabinis et al. |
| 2009/0312013 A1 | 12/2009 | Karabinis |
| 2010/0009677 A1 | 1/2010 | Karabinis et al. |
| 2010/0015971 A1 | 1/2010 | Good et al. |
| 2010/0029269 A1 | 2/2010 | Karabinis |
| 2010/0035604 A1 | 2/2010 | Dutta et al. |
| 2010/0035605 A1 | 2/2010 | Karabinis |
| 2010/0035606 A1 | 2/2010 | Karabinis |
| 2010/0039967 A1 | 2/2010 | Karabinis et al. |
| 2010/0041394 A1 | 2/2010 | Karabinis |
| 2010/0041396 A1 | 2/2010 | Karabinis |
| 2010/0048201 A1 | 2/2010 | Karabinis |
| 2010/0054160 A1 | 3/2010 | Karabinis |
| 2010/0120419 A1 | 5/2010 | Zheng et al. |
| 2010/0141509 A1 | 6/2010 | Levin et al. |
| 2010/0184370 A1 | 7/2010 | Zheng et al. |
| 2010/0184381 A1 | 7/2010 | Zheng et al. |
| 2010/0184427 A1 | 7/2010 | Zheng et al. |
| 2010/0190507 A1 | 7/2010 | Karabinis et al. |
| 2010/0203828 A1 | 8/2010 | Zheng |
| 2010/0203884 A1 | 8/2010 | Zheng et al. |
| 2010/0210209 A1 | 8/2010 | Karabinis et al. |
| 2010/0210262 A1 | 8/2010 | Karabinis et al. |
| 2010/0240362 A1 | 9/2010 | Karabinis |
| 2011/0103273 A1 | 5/2011 | Dutta |

FOREIGN PATENT DOCUMENTS

| | | |
|---|---|---|
| EP | 0 506 255 A3 | 9/1992 |
| EP | 0 597 225 A1 | 5/1994 |
| EP | 0 506 255 B1 | 11/1996 |
| EP | 0 748 065 A2 | 12/1996 |
| EP | 0 755 163 A2 | 1/1997 |
| EP | 0 762 669 A2 | 3/1997 |
| EP | 0 762 669 A3 | 3/1997 |
| EP | 0 797 319 A2 | 9/1997 |
| EP | 0 831 599 A2 | 3/1998 |
| EP | 0 831 599 A3 | 3/1998 |
| EP | 0 977 375 A2 | 2/2000 |
| EP | 1 052 790 A1 | 11/2000 |
| EP | 1 059 826 A1 | 12/2000 |
| EP | 1 193 989 A1 | 4/2002 |
| EP | 1 944 885 A2 | 7/2008 |
| EP | 1 569 363 B1 | 11/2008 |
| WO | WO 99/36795 A1 | 7/1999 |
| WO | WO 01/33738 A1 | 5/2001 |
| WO | WO 01/54314 A1 | 7/2001 |

OTHER PUBLICATIONS

Global.com, "Globalstar Demonstrates World's First Prototype of Terrestrial System to Supplemental Satellite Phones," http://www.globalcomsatphone.com/globalcom/globalstar_terrestrial_system.html, Jul. 18, 2002, 2 pages.

Communication with Supplementary European Search Report, EP 02761235.7, Sep. 3, 2008.

Communication Pursuant to Article 94(3) EPC, EP Application No. 02 761 235.7, Oct. 19, 2009.

Communication including European Search Report, to European Patent Application No. 10004824.8, Oct. 28, 2010.

Communication pursuant to Article 94(3) EPC, EP Application No. 02761235.7, Oct. 19, 2009.

European Search Report, EP Application No. 09012560.0, Nov. 11, 2009.

European Search Report, EP Application No. 10003977.5, Jun. 8, 2010.

International Preliminary Examination Report, PCT/US02/24783, Apr. 30, 2003.

International Search Report, PCT/US02/24783, Dec. 10, 2002.

Notification of Transmittal of the International Search Report and the Written Opinion of the International Searching Authority, or the Declaration, International Search Report and Written Opinion of the International Searching Authority, PCT/US2005/044336, Apr. 24, 2006.

Result of Consultation, EP Application No. 02 761 235.7, May 25, 2011.

Sklar "Digital Communications—Fundamentals and Applications, Second Edition", Prentice Hall, Sep. 2004, pp. 520-567.

Summons to attend oral proceedings pursuant to Rule 115(1) EPC, EP Application No. 05853295.3, Nov. 22, 2010.

* cited by examiner

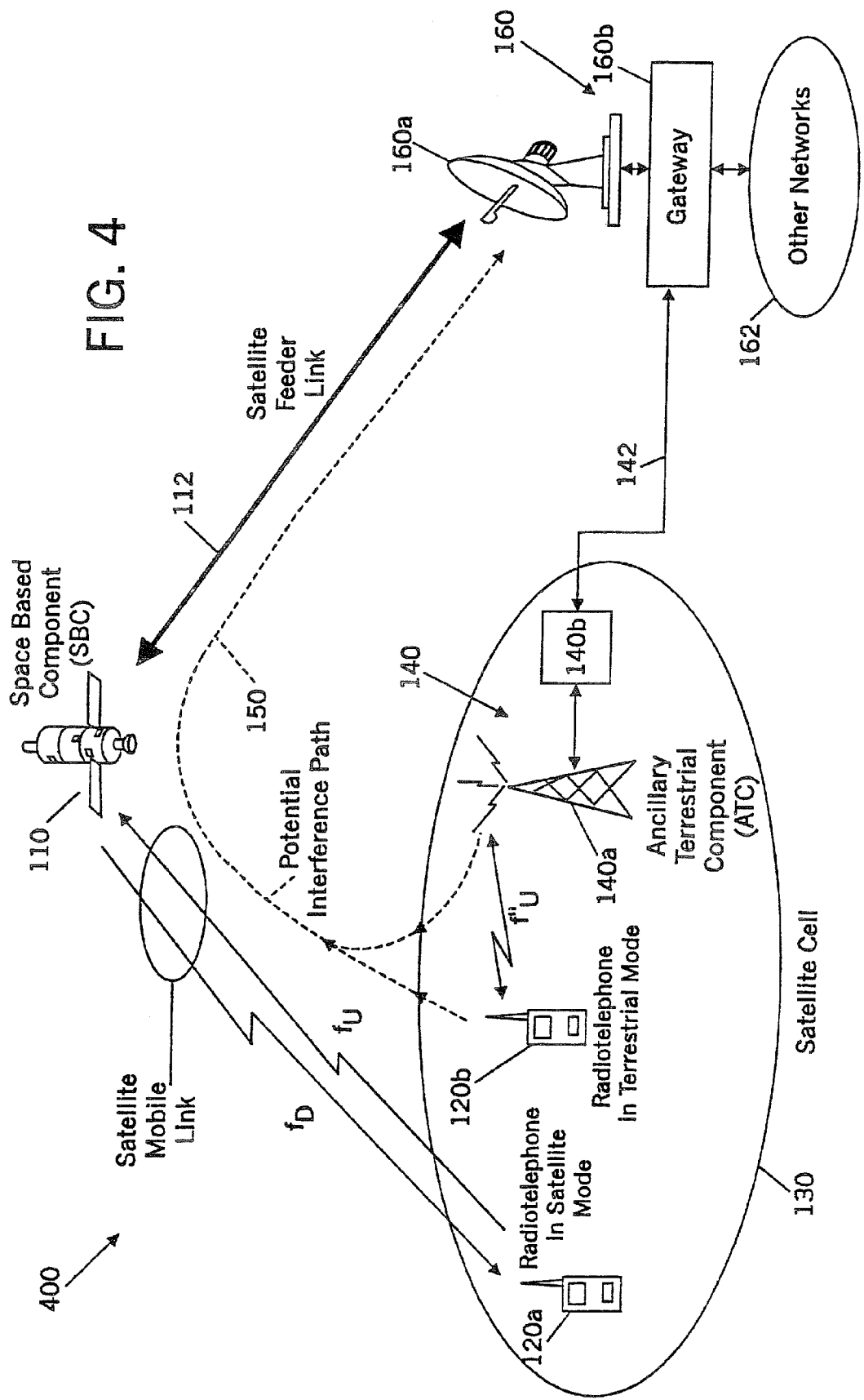

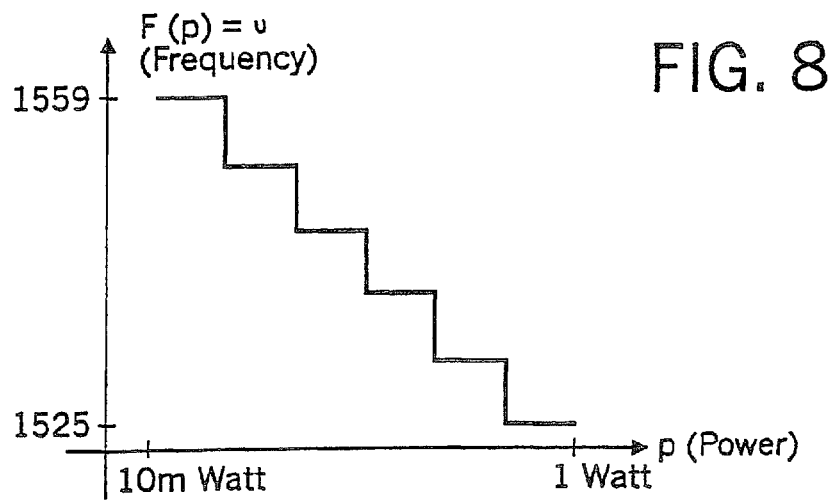
FIG. 8
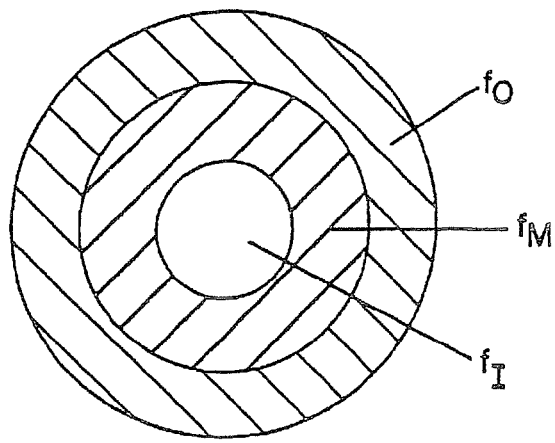
FIG. 9
FIG. 10
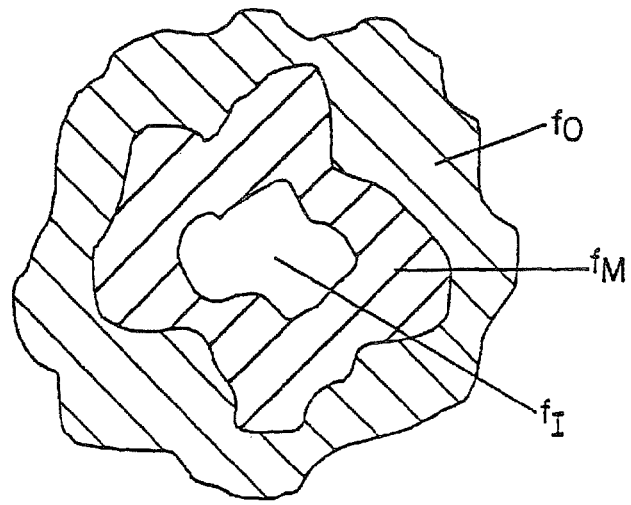

SYSTEMS AND METHODS FOR TERRESTRIAL REUSE OF CELLULAR SATELLITE FREQUENCY SPECTRUM IN A TIME-DIVISION DUPLEX AND/OR FREQUENCY-DIVISION DUPLEX MODE

CROSS-REFERENCE TO RELATED APPLICATIONS

This application is a continuation of U.S. application Ser. No. 11/021,077, filed Dec. 23, 2004 now U.S. Pat. No.7,664,460, entitled Systems and Methods for Terrestrial Reuse of Cellular Satellite Frequency Spectrum In a Time-Division Duplex and/or Frequency-Division Duplex Mode, which itself is a Continuation-in-Part (CIP) of application Ser. No. 10/730,660, filed Dec. 8, 2003 now U.S. Pat. No. 7,593,724, entitled Systems and Methods for Terrestrial Reuse of Cellular Satellite Frequency Spectrum in a Time-Division Duplex Mode, which itself is a CIP of application Ser. No. 10/074,097, filed Feb. 12, 2002, entitled Systems and Methods for Terrestrial Reuse of Cellular Satellite Frequency Spectrum, now U.S. Pat. No. 6,684,057, which itself claims the benefit of provisional Application Ser. No. 60/322,240, filed Sep. 14, 2001, entitled Systems and Methods for Terrestrial Re-Use of Mobile Satellite Spectrum, all of which are assigned to the assignee of the present application, the disclosures of all of which are hereby incorporated herein by reference in their entirety as if set forth fully herein.

FIELD OF THE INVENTION

This invention relates to radiotelephone communications systems and methods, and more particularly to terrestrial cellular and satellite cellular radiotelephone communications systems and methods.

BACKGROUND OF THE INVENTION

Satellite radiotelephone communications systems and methods are widely used for radiotelephone communications. Satellite radiotelephone communications systems and methods generally employ at least one space-based component, such as one or more satellites that are configured to wirelessly communicate with a plurality of satellite radiotelephones.

A satellite radiotelephone communications system or method may utilize a single antenna beam covering an entire area served by the system. Alternatively, in cellular satellite radiotelephone communications systems and methods, multiple beams are provided, each of which can serve distinct geographical areas in the overall service region, to collectively serve an overall satellite footprint. Thus, a cellular architecture similar to that used in conventional terrestrial cellular radiotelephone systems and methods can be implemented in cellular satellite-based systems and methods. The satellite typically communicates with radiotelephones over a bidirectional communications pathway, with radiotelephone communication signals being communicated from the satellite to the radiotelephone over a downlink or forward link, and from the radiotelephone to the satellite over an uplink or return link.

The overall design and operation of cellular satellite radiotelephone systems and methods are well known to those having skill in the art, and need not be described further herein. Moreover, as used herein, the term "radiotelephone" includes cellular and/or satellite radiotelephones with or without a multi-line display; Personal Communications System (PCS) terminals that may combine a radiotelephone with data processing, facsimile and/or data communications capabilities; Personal Digital Assistants (PDA) that can include a radio frequency transceiver and a pager, Internet/intranet access, Web browser, organizer, calendar and/or a global positioning system (GPS) receiver; and/or conventional laptop and/or palmtop computers or other appliances, which include a radio frequency transceiver.

Terrestrial networks can enhance cellular satellite radiotelephone system availability, efficiency and/or economic viability by terrestrially reusing at least some of the frequency bands that are allocated to cellular satellite radiotelephone systems. In particular, it is known that it may be difficult for cellular satellite radiotelephone systems to reliably serve densely populated areas, because the satellite signal may be blocked by high-rise structures and/or may not penetrate into buildings. As a result, the satellite spectrum may be underutilized or unutilized in such areas. The use of terrestrial retransmission can reduce or eliminate this problem.

Moreover, the capacity of the overall system can be increased significantly by the introduction of terrestrial retransmission, since terrestrial frequency reuse can be much denser than that of a satellite-only system. In fact, capacity can be enhanced where it may be mostly needed, i.e., densely populated urban/industrial/commercial areas. As a result, the overall system can become much more economically viable, as it may be able to serve a much larger subscriber base. Finally, satellite radiotelephones for a satellite radiotelephone system having a terrestrial component within the same satellite frequency band and using substantially the same air interface for both terrestrial and satellite communications can be more cost effective and/or aesthetically appealing. Conventional dual band/dual mode alternatives, such as the well known Thuraya, Iridium and/or Globalstar dual mode satellite/terrestrial radiotelephone systems, may duplicate some components, which may lead to increased cost, size and/or weight of the radiotelephone.

One example of terrestrial reuse of satellite frequencies is described in U.S. Pat. No. 5,937,332 to the present inventor Karabinis entitled Satellite Telecommunications Repeaters and Retransmission Methods, the disclosure of which is hereby incorporated herein by reference in its entirety as if set forth fully herein. As described therein, satellite telecommunications repeaters are provided which receive, amplify, and locally retransmit the downlink signal received from a satellite thereby increasing the effective downlink margin in the vicinity of the satellite telecommunications repeaters and allowing an increase in the penetration of uplink and downlink signals into buildings, foliage, transportation vehicles, and other objects which can reduce link margin. Both portable and non-portable repeaters are provided. See the abstract of U.S. Pat. No. 5,937,332.

In view of the above discussion, there continues to be a need for systems and methods for terrestrial reuse of cellular satellite frequencies that can allow improved reliability, capacity, cost effectiveness and/or aesthetic appeal for cellular satellite radiotelephone systems, methods and/or satellite radiotelephones.

SUMMARY OF THE INVENTION

Some embodiments of the present invention allow a satellite radiotelephone frequency to be reused terrestrially within the same satellite cell in time-division duplex mode. In particular, some embodiments of the present invention include a space-based component, such as a satellite, that is configured to receive wireless communications from radiotelephones in a satellite footprint over an uplink satellite radiotelephone frequency, and to transmit wireless communications to the radiotelephones over a downlink radiotelephone frequency. An ancillary terrestrial network, comprising one or more ancillary terrestrial components, is configured to transmit wireless communications to, and receive wireless communications from, the radiotelephones over the uplink satellite radiotelephone frequency in a time-division duplex mode.

The terrestrial reuse of uplink satellite radiotelephone frequencies in a time-division duplex mode may create interference at the space-based component by the ancillary terrestrial network and/or the radiotelephones, due to the terrestrial reuse of the uplink satellite frequency spectrum. However, this potential interference may be reduced and/or eliminated according to other embodiments of the present invention, by providing an interference reducer.

More specifically, in some embodiments, the space-based component is configured to receive wireless communications from a first radiotelephone in the satellite footprint over an uplink satellite radiotelephone frequency band, and to transmit wireless communications to the first radiotelephone in the satellite footprint over a downlink satellite radiotelephone frequency band. Moreover, the ancillary terrestrial network is configured to transmit wireless communications to, and receive wireless communications from, a second radiotelephone in the satellite footprint over the uplink satellite radiotelephone frequency band. The space-based component also receives the wireless communications from the second radiotelephone and/or the ancillary terrestrial network in the satellite footprint over the uplink satellite radiotelephone frequency band as interference, along with the wireless communications that are received from the first radiotelephone in the satellite footprint over the uplink satellite radiotelephone frequency band. The interference reducer is responsive to the space-based component and to the ancillary terrestrial network, and is configured to reduce the interference from the wireless communications that are received by the space-based component from the second radiotelephone and/or the ancillary terrestrial network in the satellite footprint over the uplink satellite radiotelephone frequency band, using the wireless communications that are transmitted by the ancillary terrestrial network to, and/or received by the ancillary terrestrial network from, the second radiotelephone in the satellite footprint over the uplink satellite radiotelephone frequency band.

Moreover, in some embodiments, the ancillary terrestrial network is closer to the second radiotelephone than to the space-based component, such that the wireless communications from the second radiotelephone are received by the ancillary terrestrial network, and the wireless communications from the ancillary terrestrial network to the second radiotelephone are generated by the ancillary terrestrial network, prior to reception by the space-based component. The interference reducer is configured to generate at least one delayed replica measure of the wireless communications from the second radiotelephone that are received by the ancillary terrestrial network, and/or the wireless communications from the ancillary terrestrial network to the second radiotelephone that are generated by the ancillary terrestrial network. The interference reducer is also configured to subtract the delayed replica measure of the wireless communications from the second radiotelephone that are received by the ancillary terrestrial network and/or the wireless communications from the ancillary terrestrial network to the second radiotelephone that are generated by the ancillary terrestrial network, from the wireless communications that are received from the space-based component. In some embodiments, an adaptive interference canceller may be used.

In some embodiments of the present invention, the interference reducer is at least partially included in the satellite gateway. In other embodiments, the interference reducer is at least partially included in the ancillary terrestrial network.

In other embodiments of the present invention, the ancillary terrestrial network also is configured to transmit wireless communications to, and receive wireless communications from, the radiotelephones over the downlink satellite radiotelephone frequency in a time-division duplex mode. In yet other embodiments, the space-based component may be configured to receive wireless communications from the radiotelephones and to transmit wireless communications to the radiotelephones over the uplink satellite radiotelephone frequency and/or the downlink satellite radiotelephone frequency in a time-division duplex mode.

In some embodiments of the present invention, the time-division duplex mode includes transmit/receive frames (time intervals) of fixed and/or variable durations (from transmit/receive frame to transmit/receive frame). At least one first portion of a transmit/receive frame is used to transmit wireless communications to at least one radiotelephone over the uplink satellite radiotelephone frequency. At least one second portion of a transmit/receive frame is used to receive wireless communications from at least one radiotelephone over the uplink satellite radiotelephone frequency. The first and second portions of the transmit/receive frame may be equal or different in time duration.

In still other embodiments, the uplink satellite radiotelephone frequency comprises an uplink satellite radiotelephone frequency band. The ancillary terrestrial network is configured to transmit wireless communications to, and receive wireless communications from, the radiotelephone over the uplink satellite radiotelephone frequency band in a time-division duplex mode.

In yet other embodiments of the present invention, the time-division duplex mode employs a transmit/receive frame including a plurality of slots. A first number of the slots is used to transmit wireless communications to at least one radiotelephone over the uplink satellite radiotelephone frequency. A second number of the slots is used to receive wireless communications from at least one radiotelephone over the uplink satellite radiotelephone frequency. In some embodiments, the first number is greater than the second number. In other embodiments the first number is equal to the second number.

In still other embodiments, at least a first portion and/or a first number of slots of a transmit/receive frame is used to transmit wireless communications to at least one radiotelephone over the uplink satellite radiotelephone frequency using a first modulation and/or protocol such as Orthogonal Frequency Division Multiplexed (OFDM) with M-ary Quadrature Amplitude Modulation (M-ary QAM). At least a second portion and/or a second number of slots of a transmit/receive frame is used to receive wireless communications from at least one radiotelephone over the uplink satellite radiotelephone frequency using a second modulation and/or protocol, such as Orthogonal Frequency Division Multiple Access (OFDMA) with L-ary Quadrature Amplitude Modulation (L-ary QAM), that may be less spectrally efficient than the first modulation and/or protocol ($L \leq M$).

It will be understood by those having skill in the art that the above embodiments have been described primarily with respect to a satellite radiotelephone system that includes a space-based component and an ancillary terrestrial network. However, other embodiments of the invention can provide an ancillary terrestrial component, a radiotelephone, a gateway, a space-based component and/or satellite radiotelephone communication methods for a space-based component, an ancillary terrestrial network, a gateway and/or a radiotelephone. Accordingly, an uplink satellite radiotelephone frequency or frequencies can be reused terrestrially in a time-division duplex mode while reducing, minimizing or eliminating interference with space-based use of the uplink satellite radiotelephone frequency or frequencies.

BRIEF DESCRIPTION OF THE DRAWINGS

FIG. 4 is a schematic diagram of cellular satellite systems and methods according to other embodiments of the present invention.

FIG. 8 graphically illustrates mapping of monotonically decreasing power levels to frequencies according to embodiments of the present invention.

FIG. 9 illustrates an ideal cell that is mapped to three power regions and three associated carrier frequencies according to embodiments of the invention.

FIG. 10 depicts a realistic cell that is mapped to three power regions and three associated carrier frequencies according to embodiments of the invention.

DETAILED DESCRIPTION

The present invention now will be described more fully hereinafter with reference to the accompanying drawings, in which typical embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
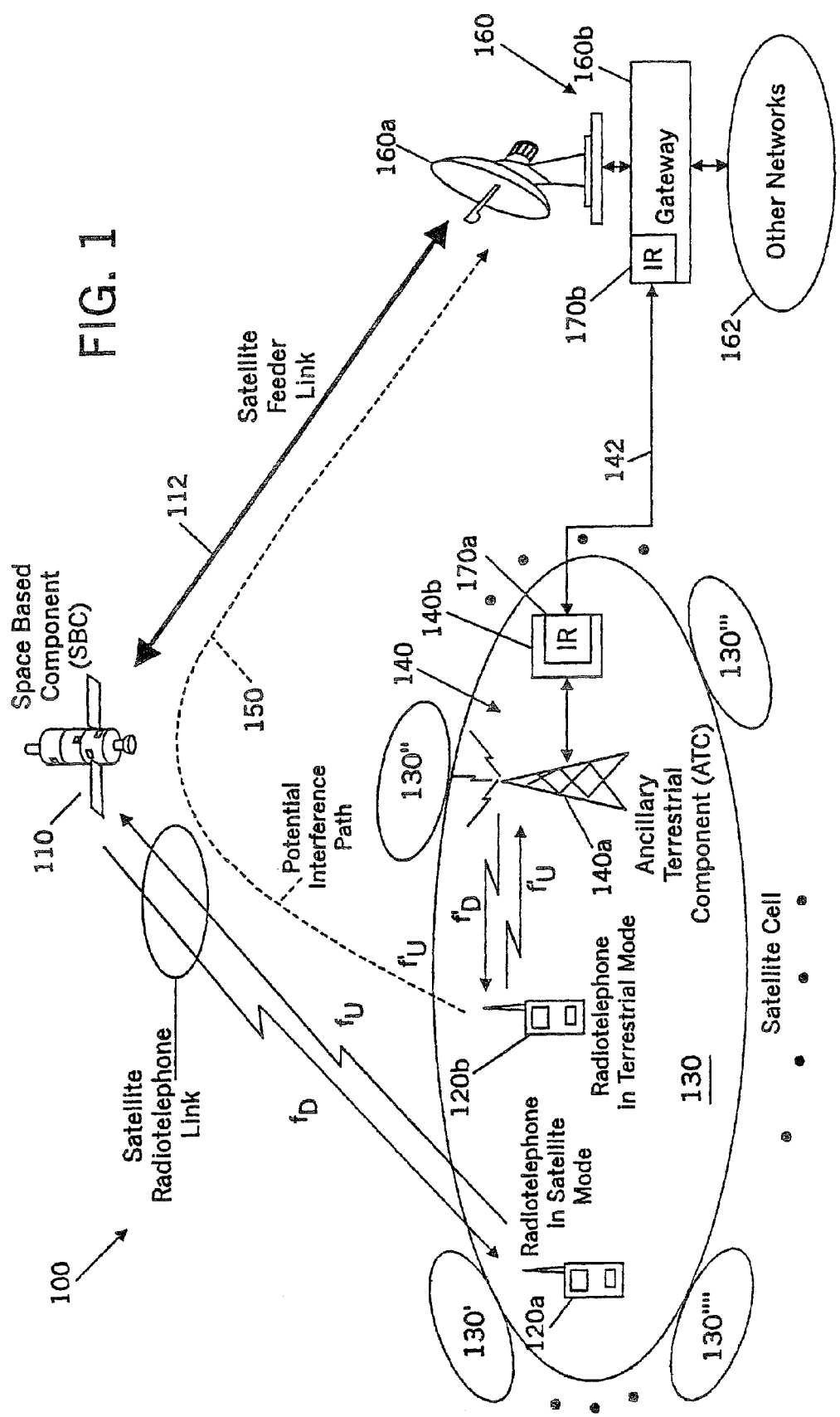
FIG. 1 is a schematic diagram of cellular radiotelephone systems and methods according to embodiments of the invention.

FIG. 1 is a schematic diagram of cellular satellite radiotelephone systems and methods according to embodiments of the invention. As shown in FIG. 1, these cellular satellite radiotelephone systems and methods 100 include at least one Space-Based Component (SBC) 110, such as a satellite. The space-based component 110 is configured to transmit wireless communications to a plurality of radiotelephones 120a, 120b in a satellite footprint comprising one or more satellite radiotelephone cells 130-130"" over one or more satellite radiotelephone forward link (downlink) frequencies $f_D$. The space-based component 110 is configured to receive wireless communications from, for example, a first radiotelephone 120a in the satellite radiotelephone cell 130 over a satellite radiotelephone return link (uplink) frequency $f_U$. An ancillary terrestrial network, comprising at least one ancillary terrestrial component 140, which may include an antenna 140a and an electronics system 140b (for example, at least one antenna 140a and at least one electronics system 140b), is configured to receive wireless communications from, for example, a second radiotelephone 120b in the radiotelephone cell 130 over the satellite radiotelephone uplink frequency, denoted $f'_U$, which may be the same as $f_U$. Thus, as illustrated in FIG. 1, radiotelephone 120a may be communicating with the space-based component 110 while radiotelephone 120b may be communicating with the ancillary terrestrial component 140. As shown in FIG. 1, the space-based component 110 also undesirably receives the wireless communications from the second radiotelephone 120b in the satellite radiotelephone cell 130 over the satellite radiotelephone frequency $f'_U$ as interference. More specifically, a potential interference path is shown at 150. In this potential interference path 150, the return link signal of the second radiotelephone 120b at carrier frequency $f'_U$ interferes with satellite communications. This interference would generally be strongest when $f'_U = f_U$, because, in that case, the same return link frequency would be used for space-based component and ancillary terrestrial component communications over the same satellite radiotelephone cell, and no spatial discrimination between satellite radiotelephone cells would appear to exist.

Still referring to FIG. 1, embodiments of satellite radiotelephone systems/methods 100 can include at least one gateway 160 that can include an antenna 160a and an electronics system 160b that can be connected to other networks 162 including terrestrial and/or other radiotelephone networks. The gateway 160 also communicates with the space-based component 110 over a satellite feeder link 112. The gateway 160 also communicates with the ancillary terrestrial component 140, generally over a terrestrial link 142.

Still referring to FIG. 1, an Interference Reducer (IR) 170a also may be provided at least partially in the ancillary terrestrial component electronics system 140b. Alternatively or additionally, an interference reducer 170b may be provided at least partially in the gateway electronics system 160b. In yet other alternatives, the interference reducer may be provided at least partially in other components of the cellular satellite system/method 100 instead of or in addition to the interference reducer 170a and/or 170b. The interference reducer is responsive to the space-based component 110 and to the ancillary terrestrial component 140, and is configured to reduce the interference from the wireless communications that are received by the space-based component 110 and is at least partially generated by the second radiotelephone 120b in the satellite radiotelephone cell 130 over the satellite radiotelephone frequency $f'_U$. The interference reducer 170a and/or 170b uses the wireless communications $f'_U$ that are intended for the ancillary terrestrial component 140 from the second radiotelephone 120b in the satellite radiotelephone cell 130 using the satellite radiotelephone frequency $f'_U$ to communicate with the ancillary terrestrial component 140.

In embodiments of the invention, as shown in FIG. 1, the ancillary terrestrial component 140 generally is closer to the first and second radiotelephones 120a and 120b, respectively, than is the space-based component 110, such that the wireless communications from the second radiotelephone 120b are received by the ancillary terrestrial component 140 prior to being received by the space-based component 110. The interference reducer 170a and/or 170b is configured to generate an interference cancellation signal comprising, for example, at least one delayed replica of the wireless communications from the second radiotelephone 120b that are received by the ancillary terrestrial component 140, and to subtract the delayed replica of the wireless communications from the second radiotelephone 120b that are received by the ancillary terrestrial component 140 from the wireless communications that are received from the space-based component 110. The interference reduction signal may be transmitted from the ancillary terrestrial component 140 to the gateway 160 over link 142 and/or using other conventional techniques.

Thus, adaptive interference reduction techniques may be used to at least partially cancel the interfering signal, so that the same, or other nearby, satellite radiotelephone uplink frequency can be used in a given cell for communications by radiotelephones 120 with the satellite 110 and with the ancillary terrestrial component 140. Accordingly, all frequencies that are assigned to a given cell 130 may be used for both radiotelephone 120 communications with the space-based component 110 and with the ancillary terrestrial component 140. Conventional systems may avoid terrestrial reuse of frequencies within a given satellite cell that are being used within the satellite cell for satellite communications. Stated differently, conventionally, only frequencies used by other satellite cells may be candidates for terrestrial reuse within a given satellite cell. Beam-to-beam spatial isolation that is provided by the satellite system was relied upon to reduce or minimize the level of interference from the terrestrial operations into the satellite operations. In sharp contrast, embodiments of the invention can use an interference reducer to allow all frequencies assigned to a satellite cell to be used terrestrially and for satellite radiotelephone communications.

Embodiments of the invention according to FIG. 1 may arise from a realization that the return link signal from the second radiotelephone 120b at $f_U$ generally will be received and processed by the ancillary terrestrial component 140 much earlier relative to the time when it will arrive at the satellite gateway 160 from the space-based component 110 via the interference path 150. Accordingly, the interference signal at the satellite gateway 160b can be at least partially canceled. Thus, as shown in FIG. 1, an interference cancellation signal, such as the demodulated ancillary terrestrial component signal, can be sent to the satellite gateway 160b by the interference reducer 170a in the ancillary terrestrial component 140, for example using link 142. In the interference reducer 170b at the gateway 160b, a weighted (in amplitude and/or phase) replica of the signal may be formed using, for example, adaptive transversal filter techniques that are well known to those having skill in the art. Then, a transversal filter output signal is subtracted from the aggregate received satellite signal at frequency $f_U$ that contains desired as well as interference signals. Thus, the interference cancellation need not degrade the signal-to-noise ratio of the desired signal at the gateway 160, because a regenerated (noise-free) terrestrial signal, for example as regenerated by the ancillary terrestrial component 140, can be used to perform interference suppression.

Figure 2:
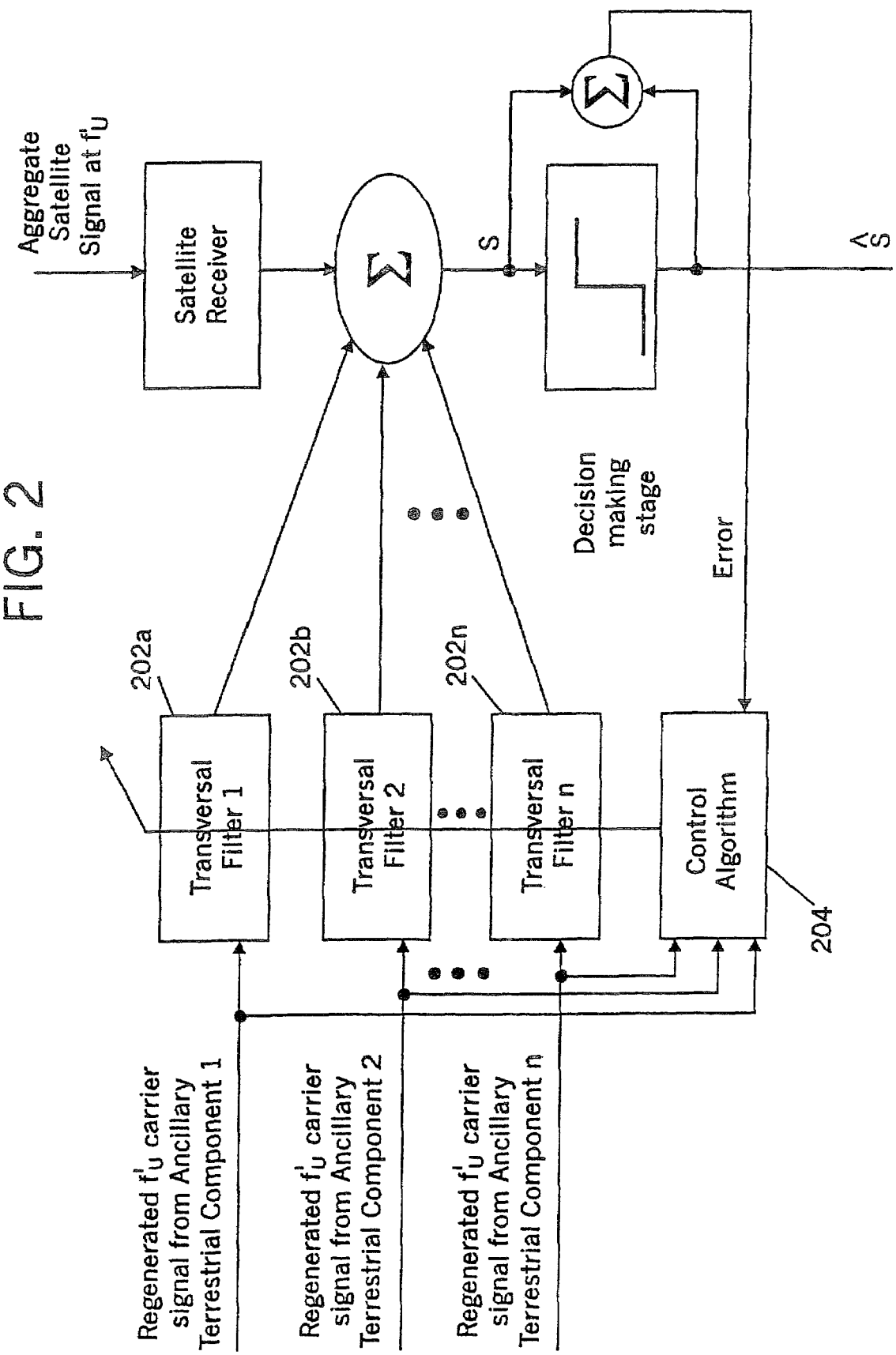
FIG. 2 is a block diagram of adaptive interference reducers according to embodiments of the present invention.

FIG. 2 is a block diagram of embodiments of adaptive interference cancellers that may be located in the ancillary terrestrial component 140, in the gateway 160, and/or in another component of the cellular radiotelephone system 100. As shown in FIG. 2, one or more control algorithms 204, known to those having skill in the art, may be used to adaptively adjust the coefficients of a plurality of transversal filters 202a-202n. Adaptive algorithms, such as Least Mean Square Error (LMSE), Kalman, Fast Kalman, Zero Forcing and/or various combinations thereof or other techniques may be used. It will be understood by those having skill in the art that the architecture of FIG. 2 may be used with an LMSE algorithm. However, it also will be understood by those having skill in the art that conventional architectural modifications may be made to facilitate other control algorithms.

Figure 3:
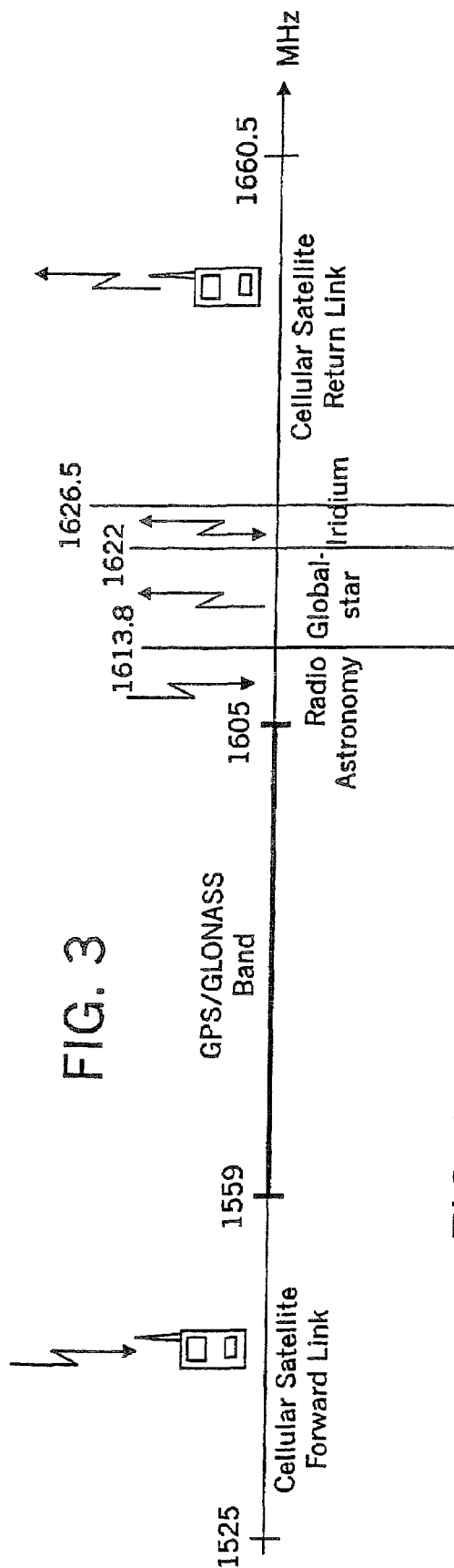
FIG. 3 is a spectrum diagram that illustrates satellite L-band frequency allocations.

Additional embodiments of the invention now will be described with reference to FIG. 3, which illustrates L-band frequency allocations including cellular radiotelephone system forward links and return links. As shown in FIG. 3, the space-to-ground L-band forward link (downlink) frequencies are assigned from 1525 MHz to 1559 MHz. The ground-to-space L-band return link (uplink) frequencies occupy the band from 1626.5 MHz to 1660.5 MHz. Between the forward and return L-band links lie the GPS/GLONASS radionavigation band (from 1559 MHz to 1605 MHz).

In the detailed description to follow, GPS/GLONASS will be referred to simply as GPS for the sake of brevity. Moreover, the acronyms ATC and SBC will be used for the ancillary terrestrial component and the space-based component, respectively, for the sake of brevity.

As is known to those skilled in the art, GPS receivers may be extremely sensitive since they are designed to operate on very weak spread-spectrum radionavigation signals that arrive on the earth from a GPS satellite constellation. As a result, GPS receivers may to be highly susceptible to in-band interference. ATCs that are configured to radiate L-band frequencies in the forward satellite band (1525 to 1559 MHz) can be designed with very sharp out-of-band emissions filters to satisfy the stringent out-of-band spurious emissions desires of GPS.

Referring again to FIG. 1, some embodiments of the invention can provide systems and methods that can allow an ATC 140 to configure itself in one of at least two modes. In accordance with a first mode, which may be a standard mode and may provide highest capacity, the ATC 140 transmits to the radiotelephones 120 over the frequency range from 1525 MHz to 1559 MHz, and receives transmissions from the radiotelephones 120 in the frequency range from 1626.5 MHz to 1660.5 MHz, as illustrated in FIG. 3. In contrast, in a second mode of operation, the ATC 140 transmits wireless communications to the radiotelephones 120 over a modified range of satellite band forward link (downlink) frequencies. The modified range of satellite band forward link frequencies may be selected to reduce, compared to the unmodified range of satellite band forward link frequencies, interference with wireless receivers such as GPS receivers that operate outside the range of satellite band forward link frequencies.

Many modified ranges of satellite band forward link frequencies may be provided according to embodiments of the present invention. In some embodiments, the modified range of satellite band forward link frequencies can be limited to a subset of the original range of satellite band forward link frequencies, so as to provide a guard band of unused satellite band forward link frequencies. In other embodiments, all of the satellite band forward link frequencies are used, but the wireless communications to the radiotelephones are modified in a manner to reduce interference with wireless receivers that operate outside the range of satellite band forward link frequencies. Combinations and subcombinations of these and/or other techniques also may be used, as will be described below.

It also will be understood that embodiments of the invention that will now be described in connection with FIGS. 4-12 will be described in terms of multiple mode ATCs 140 that can operate in a first standard mode using the standard forward and return links of FIG. 3, and in a second or alternate mode that uses a modified range of satellite band forward link frequencies and/or a modified range of satellite band return link frequencies. These multiple mode ATCs can operate in the second, non-standard mode, as long as desirable, and can be switched to standard mode otherwise. However, other embodiments of the present invention need not provide multiple mode ATCs but, rather, can provide ATCs that operate using the modified range of satellite band forward link and/or return link frequencies.

Embodiments of the invention now will be described, wherein an ATC operates with an SBC that is configured to receive wireless communications from radiotelephones over a first range of satellite band return link frequencies and to transmit wireless communications to the radiotelephones over a second range of satellite band forward link frequencies that is spaced apart from the first range. According to these embodiments, the ATC is configured to use at least one time-division duplex frequency to transmit wireless communications to the radiotelephones and to receive wireless communications from the radiotelephones at different times. In particular, in some embodiments, the at least one time-division duplex frequency that is used to transmit wireless communications to the radiotelephones and to receive wireless communications from the radiotelephones at different times, comprises a frame including a plurality of slots. At least a first one of the slots is used to transmit wireless communications to the radiotelephones and at least a second one of the slots is used to receive wireless communications from the radiotelephones. Thus, in some embodiments, the ATC transmits and receives, in Time-division Duplex (TDD) mode, using frequencies from 1626.5 MHz to 1660.5 MHz. In some embodiments, all ATCs across the entire network may have the stated configuration/reconfiguration flexibility. In other embodiments, only some ATCs may be reconfigurable.

Figure 5:
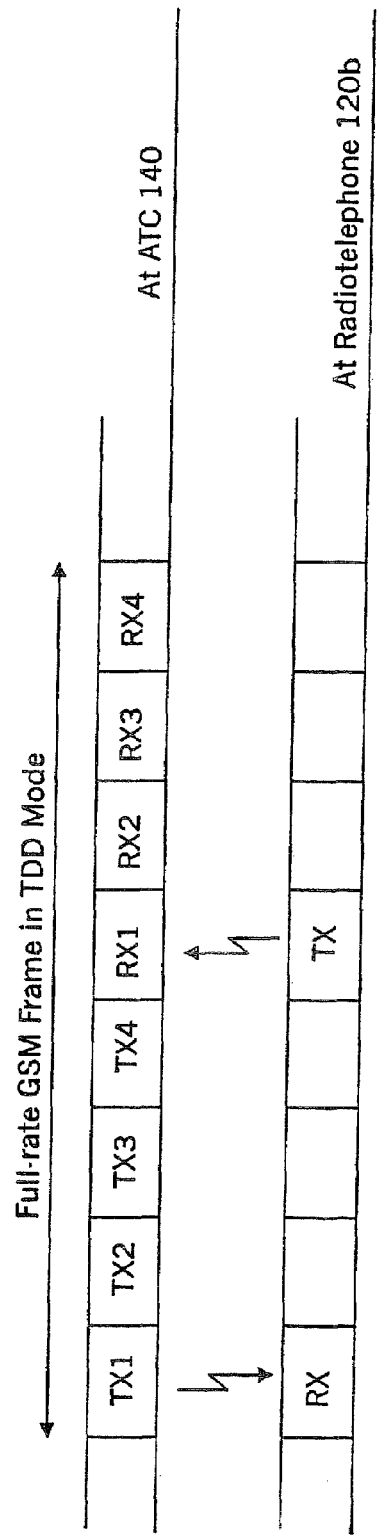
FIG. 5 illustrates time-division duplex frame structures according to embodiments of the present invention.

FIG. 4 illustrates satellite systems and methods 400 according to some embodiments of the invention, including an ATC 140 communicating with a radiotelephone 120b using a carrier frequency $f''_U$ in TDD mode. FIG. 5 illustrates an embodiment of a TDD frame structure. Assuming full-rate GSM (eight time slots per frame), up to four full-duplex voice circuits can be supported by one TDD carrier. As shown in FIG. 5, the ATC 140 transmits to the radiotelephone 120b over, for example, time slot number 0. The radiotelephone 120b receives and replies back to the ATC 140 over, for example, time slot number 4. Time slots number 1 and 5 may be used to establish communications with another radiotelephone, and so on.

A Broadcast Control CHannel (BCCH) is preferably transmitted from the ATC 140 in standard mode, using a carrier frequency from below any guard band exclusion region. In other embodiments, a BCCH also can be defined using a TDD carrier. In any of these embodiments, radiotelephones in idle mode can, per established GSM methodology, monitor the BCCH and receive system-level and paging information. When a radiotelephone is paged, the system decides what type of resource to allocate to the radiotelephone in order to establish the communications link. Whatever type of resource is allocated for the radiotelephone communications channel (TDD mode or standard mode), the information is communicated to the radiotelephone, for example as part of the call initialization routine, and the radiotelephone configures itself appropriately.

It may be difficult for the TDD mode to co-exist with the standard mode over the same ATC, due, for example, to the ATC receiver LNA stage. In particular, assuming a mixture of standard and TDD mode GSM carriers over the same ATC, during the part of the frame when the TDD carriers are used to serve the forward link (when the ATC is transmitting TDD) enough energy may leak into the receiver front end of the same ATC to desensitize its LNA stage.

Techniques can be used to suppress the transmitted ATC energy over the 1600 MHz portion of the band from desensitizing the ATC's receiver LNA, and thereby allow mixed standard mode and TDD frames. For example, isolation between outbound and inbound ATC front ends and/or antenna system return loss may be increased or maximized. A switchable band-reject filter may be placed in front of the LNA stage. This filter would be switched in the receiver chain (prior to the LNA) during the part of the frame when the ATC is transmitting TDD, and switched out during the rest of the time. An adaptive interference canceller can be configured at RF (prior to the LNA stage). If such techniques are used, suppression of the order of 70 dB can be attained, which may allow mixed standard mode and TDD frames. However, the ATC complexity and/or cost may increase.

Thus, even though ATC LNA desensitization may be reduced or eliminated, it may use significant special engineering and attention and may not be economically worth the effort. Other embodiments, therefore, may keep TDD ATCs pure TDD, with the exception, perhaps, of the BCCH carrier which may not be used for traffic but only for broadcasting over the first part of the frame, consistent with TDD protocol. Moreover, Random Access CHannel (RACH) bursts may be timed so that they arrive at the ATC during the second half of the TDD frame. In some embodiments, all TDD ATCs may be equipped to enable reconfiguration in response to a command.

It is well recognized that during data communications or other applications, the forward link may use transmissions at higher rates than the return link. For example, in web browsing with a radiotelephone, mouse clicks and/or other user selections typically are transmitted from the radiotelephone to the system. The system, however, in response to a user selection, may have to send large data files to the radiotelephone. Hence, other embodiments of the invention may be configured to enable use of an increased or maximum number of time slots per forward GSM carrier flame, to provide a higher downlink data rate to the radiotelephones.

Thus, when a carrier frequency is configured to provide service in TDD mode, a decision may be made as to how many slots will be allocated to serving the forward link, and how many will be dedicated to the return link. Whatever the decision is, it may be desirable that it be adhered to by all TDD carriers used by the ATC, in order to reduce or avoid the LNA desensitization problem described earlier. In voice communications, the partition between forward and return link slots may be made in the middle of the frame as voice activity typically is statistically bidirectionally symmetrical. Hence driven by voice, the center of the frame may be where the TDD partition is drawn.

To increase or maximize forward link throughput in data mode, data mode TDD carriers according to embodiments of the invention may use a more spectrally efficient modulation and/or protocol, such as the EDGE modulation and/or protocol, on the forward link slots. The return link slots may be based on a less spectrally efficient modulation and/or protocol such as the GPRS (GMSK) modulation and/or protocol. The EDGE modulation protocol and the GPRS modulation/protocol are well known to those having skill in the art, and need not be described further herein. Given an EDGE forward/GPRS return TDD carrier strategy, up to (384/2)=192 kbps may be supported on the forward link while on the return link the radiotelephone may transmit at up to (115/2)≈64 kbps.

In other embodiments, it also is possible to allocate six time slots of an eight-slot frame for the forward link and only two for the return link. In these embodiments, for voice services, given the statistically symmetric nature of voice, the return link vocoder may need to be comparable with quarter-rate GSM, while the forward link vocoder can operate at full-rate GSM, to yield six full-duplex voice circuits per GSM TDD-mode carrier (a voice capacity penalty of 25%). Subject to this non-symmetrical partitioning strategy, data rates of up to (384)(6/8)=288 kbps may be achieved on the forward link, with up to (115)(2/8)≈32 kbps on the return link.

Figure 6:
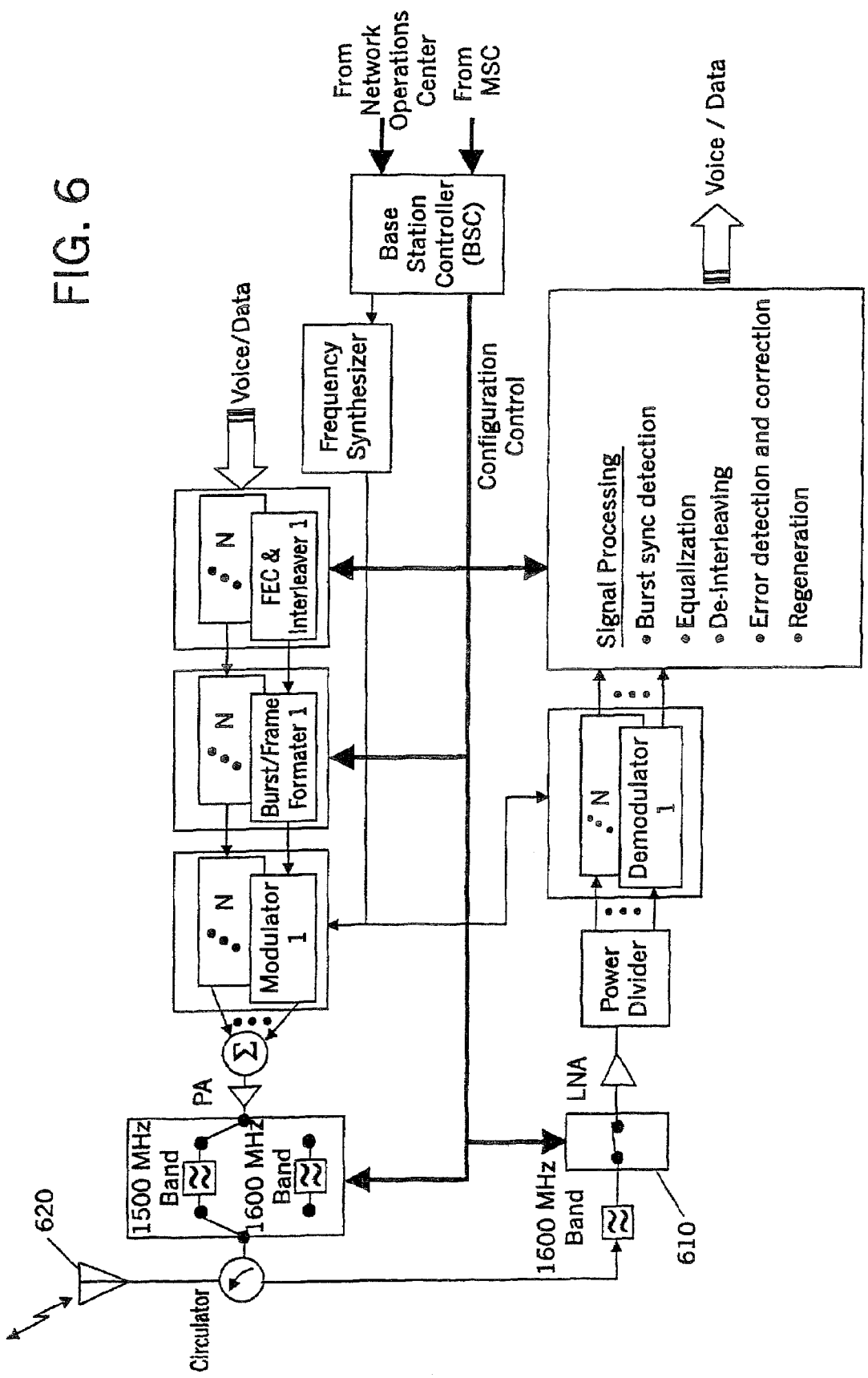
FIG. 6 is a block diagram of architectures of ancillary terrestrial components according to embodiments of the invention.

FIG. 6 depicts an ATC architecture according to embodiments of the invention, which can lend itself to automatic configuration between the two modes of standard GSM and TDD GSM on command, for example, from a Network Operations Center (NOC) via a Base Station Controller (BSC). It will be understood that in these embodiments, an antenna 620 can correspond to the antenna 140a of FIGS. 1 and 4, and the remainder of FIG. 6 can correspond to the electronics system 140b of FIGS. 1 and 4. If a reconfiguration command for a particular carrier, or set of carriers, occurs while the carrier(s) are active and are supporting traffic, then, via the in-band signaling Fast Associated Control CHannel (FACCH), all affected radiotelephones may be notified to also reconfigure themselves and/or switch over to new resources. If carrier(s) are reconfigured from TDD mode to standard mode, automatic reassignment of the carrier(s) to the appropriate standard-mode ATCs, based, for example, on capacity demand and/or reuse pattern can be initiated by the NOC. If, on the other hand, carrier(s) are reconfigured from standard mode to TDD mode, automatic reassignment to the appropriate TDD-mode ATCs can take place on command from the NOC.

Still referring to FIG. 6, a switch 610 may remain closed when carriers are to be demodulated in the standard mode. In TDD mode, this switch 610 may be open during the first half of the frame, when the ATC is transmitting, and closed during the second half of the frame, when the ATC is receiving. Other embodiments also may be provided.

FIG. 6 assumes N transceivers per ATC sector, where N can be as small as one, since a minimum of one carrier per sector generally is desired. Each transceiver is assumed to operate over one GSM carrier pair (when in standard mode) and can thus support up to eight full-duplex voice circuits, neglecting BCCH channel overhead. Moreover, a standard GSM carrier pair can support sixteen full-duplex voice circuits when in half-rate GSM mode, and up to thirty two full-duplex voice circuits when in quarter-rate GSM mode.

Figure 7:
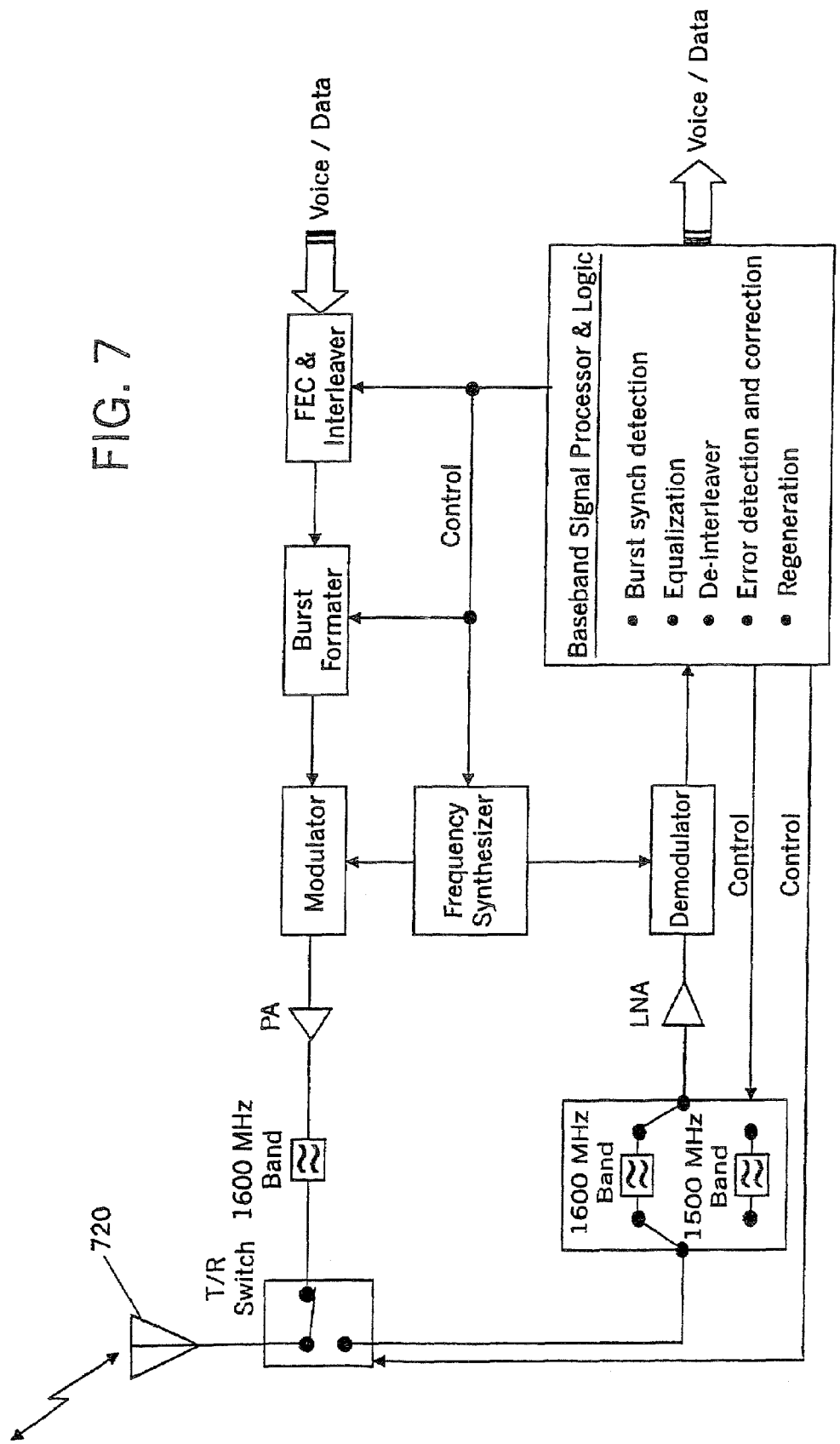
FIG. 7 is a block diagram of architectures of reconfigurable radiotelephones according to embodiments of the invention.

When in TDD mode, the number of full duplex voice circuits may be reduced by a factor of two, assuming the same vocoder. However, in TDD mode, voice service can be offered via the half-rate GSM vocoder with almost imperceptible quality degradation, in order to maintain invariant voice capacity. FIG. 7 is a block diagram of a reconfigurable radiotelephone architecture that can communicate with a reconfigurable ATC architecture of FIG. 6. In FIG. 7, an antenna 720 is provided, and the remainder of FIG. 7 can provide embodiments of an electronics system for the radiotelephone.

It will be understood that the ability to reconfigure ATCs and radiotelephones according to embodiments of the invention may be obtained at a relatively small increase in cost. The cost may be mostly in Non-Recurring Engineering (NRE) cost to develop software. Some recurring cost may also be incurred, however, in that at least an additional RF filter and a few electronically controlled switches may be used per ATC and radiotelephone. All other hardware/software can be common to standard-mode and TDD-mode GSM.

Referring now to FIG. 8, other radiotelephone systems and methods according to embodiments of the invention now will be described. In these embodiments, the modified second range of satellite band forward link frequencies includes a plurality of frequencies in the second range of satellite band forward link frequencies that are transmitted by the ATCs to the radiotelephones at a power level, such as maximum power level, that monotonically decreases as a function of (increasing) frequency. More specifically, as will be described below, in some embodiments, the modified second range of satellite band forward link frequencies includes a subset of frequencies proximate to a first or second end of the range of satellite band forward link frequencies that are transmitted by the ATC to the radiotelephones at a power level, such as a maximum power level, that monotonically decreases toward the first or second end of the second range of satellite band forward link frequencies. In still other embodiments, the first range of satellite band return link frequencies is contained in an L-band of satellite frequencies above GPS frequencies and the second range of satellite band forward link frequencies is contained in the L-band of satellite frequencies below the GPS frequencies. The modified second range of satellite band forward link frequencies includes a subset of frequencies proximate to an end of the second range of satellite band forward link frequencies adjacent the GPS frequencies that are transmitted by the ATC to the radiotelephones at a power level, such as a maximum power level, that monotonically decreases toward the end of the second range of satellite band forward link frequencies adjacent the GPS frequencies.

Without being bound by any theory of operation, a theoretical discussion of the mapping of ATC maximum power levels to carrier frequencies according to embodiments of the present invention now will be described. Referring to FIG. 8, let $v=\mathcal{F}(\rho)$ represent a mapping from the power ($\rho$) domain to the frequency ($v$) range. The power ($\rho$) is the power that an ATC uses or should transmit in order to reliably communicate with a given radiotelephone. This power may depend on many factors such as the radiotelephone's distance from the ATC, the blockage between the radiotelephone and the ATC, the level of multipath fading in the channel, etc., and as a result, will, in general, change as a function of time. Hence, the power used generally is determined adaptively (iteratively) via closed-loop power control, between the radiotelephone and ATC.

The frequency ($v$) is the satellite carrier frequency that the ATC uses to communicate with the radiotelephone. According to embodiments of the invention, the mapping $\mathcal{F}$ is a monotonically decreasing function of the independent variable $\rho$. Consequently, in some embodiments, as the maximum ATC power increases, the carrier frequency that the ATC uses to establish and/or maintain the communications link decreases. FIG. 8 illustrates an embodiment of a piece-wise continuous monotonically decreasing (stair-case) function. Other monotonic functions may be used, including linear and/or nonlinear, constant and/or variable decreases. FACCH or Slow Associated Control CHannel (SACCH) messaging may be used in embodiments of the invention to facilitate the mapping adaptively and in substantially real time.

FIG. 9 depicts an ideal cell according to embodiments of the invention, where, for illustration purposes, three power regions and three associated carrier frequencies (or carrier frequency sets) are being used to partition a cell. For simplicity, one ATC transmitter at the center of the idealized cell is assumed with no sectorization. In embodiments of FIG. 9, the frequency (or frequency set) $f_I$ is taken from substantially the upper-most portion of the L-band forward link frequency set, for example from substantially close to 1559 MHz (see FIG. 3). Correspondingly, the frequency (or frequency set) $f_M$ is taken from substantially the central portion of the L-band forward link frequency set (see FIG. 3). In concert with the above, the frequency (or frequency set) $f_O$ is taken from substantially the lowest portion of the L-band forward link frequencies, for example close to 1525 MHz (see FIG. 3).

Thus, according to embodiments of FIG. 9, if a radiotelephone is being served within the outer-most ring of the cell, that radiotelephone is being served via frequency $f_O$. This radiotelephone, being within the furthest area from the ATC, has (presumably) requested maximum (or near maximum) power output from the ATC. In response to the maximum (or near maximum) output power request, the ATC uses its a priori knowledge of power-to-frequency mapping, such as a three-step staircase function of FIG. 9. Thus, the ATC serves the radiotelephone with a low-value frequency taken from the lowest portion of the mobile L-band forward link frequency set, for example, from as close to 1525 MHz as possible. This, then, can provide additional safeguard to any GPS receiver unit that may be in the vicinity of the ATC.

Embodiments of FIG. 9 may be regarded as idealized because they associate concentric ring areas with carrier frequencies (or carrier frequency sets) used by an ATC to serve its area. In reality, concentric ring areas generally will not be the case. For example, a radiotelephone can be close to the ATC that is serving it, but with significant blockage between the radiotelephone and the ATC due to a building. This radiotelephone, even though relatively close to the ATC, may also request maximum (or near maximum) output power from the ATC. With this in mind, FIG. 10 may depict a more realistic set of area contours that may be associated with the frequencies being used by the ATC to serve its territory, according to embodiments of the invention. The frequency (or frequency set) $f_I$ may be reused in the immediately adjacent ATC cells owing to the limited geographical span associated with $f_I$ relative to the distance between cell centers. This may also hold for $f_M$.

Figure 11:
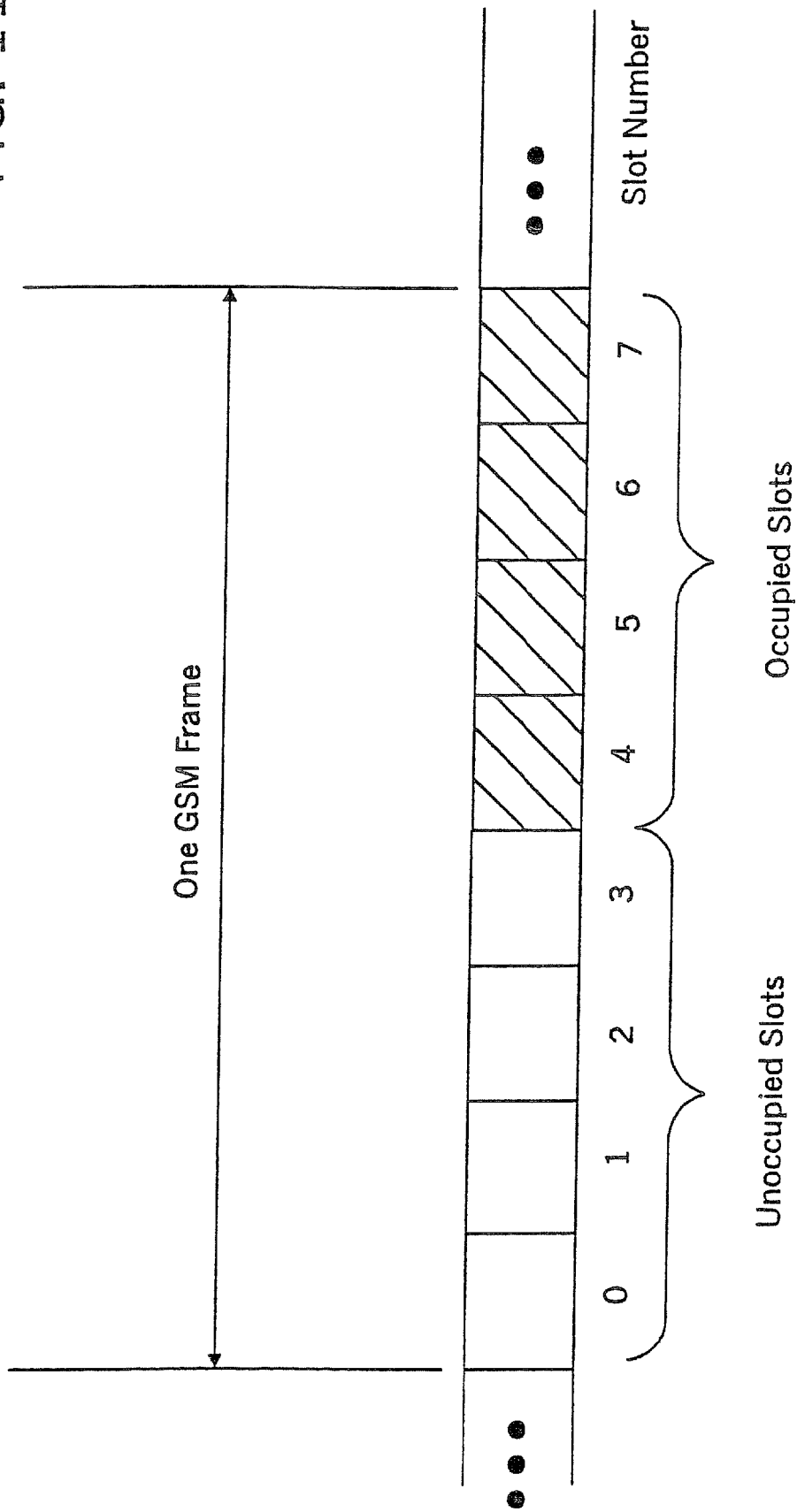
FIG. 11 illustrates two or more contiguous slots in a frame that are unoccupied according to embodiments of the present invention.

Referring now to FIG. 11, other modified second ranges of satellite band forward link frequencies that can be used by ATCs according to embodiments of the present invention now will be described. In these embodiments, at least one frequency in the modified second range of satellite band forward link frequencies that is transmitted by the ATC to the radiotelephones comprises a frame including a plurality of slots. In these embodiments, at least two contiguous slots in the frame that is transmitted by the ATC to the radiotelephones are left unoccupied. In other embodiments, three contiguous slots in the frame that is transmitted by the ATC to the radiotelephones are left unoccupied. In yet other embodiments, at least two contiguous slots in the frame that is transmitted by the ATC to the radiotelephones are transmitted at lower power than remaining slots in the frame. In still other embodiments, three contiguous slots in the frame that is transmitted by the ATC to the radiotelephones are transmitted at lower power than remaining slots in the frame. In yet other embodiments, the lower power slots may be used with first selected ones of the radiotelephones that are relatively close to the ATC and/or are experiencing relatively small signal blockage, and the remaining slots are transmitted at higher power to second selected ones of the radiotelephones that are relatively far from the ATC and/or are experiencing relatively high signal blockage.

Stated differently, in accordance with some embodiments of the invention, only a portion of the TDMA frame is utilized. For example, only the first four (or last four, or any contiguous four) time slots of a full-rate GSM frame are used to support traffic. The remaining slots are left unoccupied (empty). In these embodiments, capacity may be lost. However, as has been described previously, for voice services, half-rate and even quarter-rate GSM may be invoked to gain capacity back, with some potential degradation in voice quality. The slots that are not utilized preferably are contiguous, such as slots 0 through 3 or 4 through 7 (or 2 through 5, etc.). The use of non-contiguous slots such as 0, 2, 4, and 6, for example, may be less desirable. FIG. 11 illustrates four slots (4-7) being used and four contiguous slots (0-3) being empty in a GSM frame.

It has been found experimentally, according to these embodiments of the invention, that GPS receivers can perform significantly better when the interval between interference bursts is increased or maximized. Without being bound by any theory of operation, this effect may be due to the relationship between the code repetition period of the GPS C/A code (1 msec.) and the GSM burst duration (about 0.577 msec.). With a GSM frame occupancy comprising alternate slots, each GPS signal code period can experience at least one "hit", whereas a GSM frame occupancy comprising four to five contiguous slots allows the GPS receiver to derive sufficient clean information so as to "flywheel" through the error events.

According to other embodiments of the invention, embodiments of FIGS. 8-10 can be combined with embodiments of FIG. 11. Furthermore, according to other embodiments of the invention, if an $f_I$ carrier of FIG. 9 or 10 is underutilized, because of the relatively small footprint of the inner-most region of the cell, it may be used to support additional traffic over the much larger outermost region of the cell.

Figure 12:
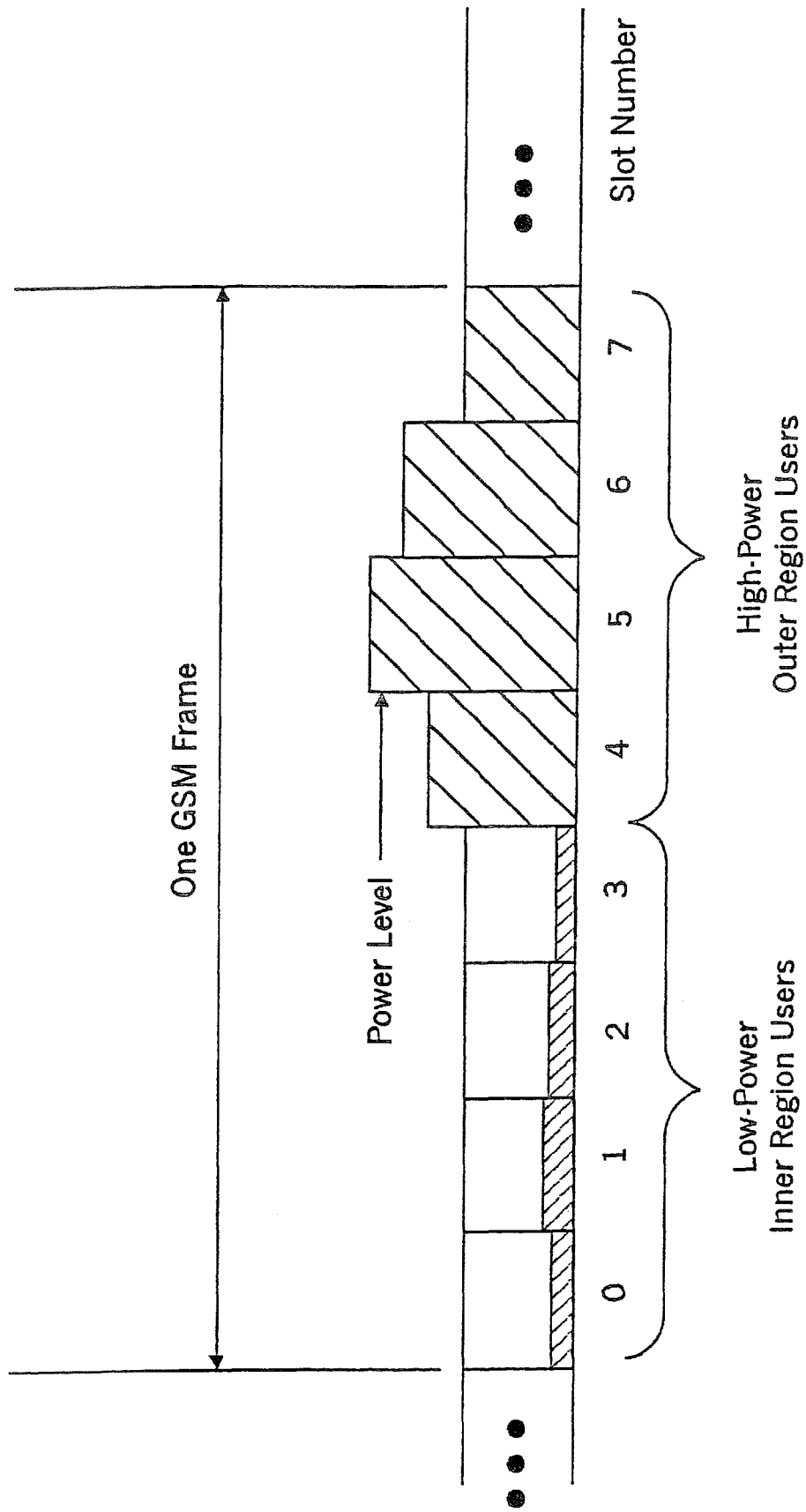
FIG. 12 illustrates loading of two or more contiguous slots with lower power transmissions according to embodiments of the present invention.

Thus, for example, assume that only the first four slots in each frame of $f_I$ are being used for inner region traffic. In embodiments of FIGS. 8-10, these four $f_I$ slots are carrying relatively low power bursts, for example of the order of 100 mW or less, and may, therefore, appear as (almost) unoccupied from an interference point of view. Loading the remaining four (contiguous) time slots of $f_I$ with relatively high-power bursts may have negligible effect on a GPS receiver because the GPS receiver would continue to operate reliably based on the benign contiguous time interval occupied by the four low-power GSM bursts. FIG. 12 illustrates embodiments of a frame at carrier $f_I$ supporting four low-power (inner interval) users and four high-power (outer interval) users. In fact, embodiments illustrated in FIG. 12 may be a preferred strategy for the set of available carrier frequencies that are closest to the GPS band. These embodiments may avoid undue capacity loss by more fully loading the carrier frequencies.

The experimental finding that interference from GSM carriers can be relatively benign to GPS receivers provided that no more than, for example, 5 slots per 8 slot GSM frame are used in a contiguous fashion can be very useful. It can be particularly useful since this experimental finding may hold even when the GSM carrier frequency is brought very close to the GPS band (as close as 1558.5 MHz) and the power level is set relatively high. For example, with five contiguous time slots per frame populated, the worst-case measured GPS receiver may attain at least 30 dB of desensitization margin, over the entire ATC service area, even when the ATC is radiating at 1558.5 MHz. With four contiguous time slots per frame populated, an additional 10 dB desensitization margin may be gained for a total of 40 dB for the worst-case measured GPS receiver, even when the ATC is radiating at 1558.5 MHz.

There still may be concern about the potential loss in network capacity (especially in data mode) that may be incurred over the frequency interval where embodiments of FIG. 11 are used to under-populate the frame. Moreover, even though embodiments of FIG. 12 can avoid capacity loss by fully loading the carrier, they may do so subject to the constraint of filling up the frame with both low-power and high-power users. Moreover, if forward link carriers are limited to 5 contiguous high power slots per frame, the maximum forward link data rate per carrier that may be aimed at a particular user may become proportionately less.

Therefore, in other embodiments, carriers which are subject to contiguous empty/low power slots are not used for the forward link. Instead, they are used for the return link. Consequently, in some embodiments, at least part of the ATC is configured in reverse frequency mode compared to the SBC in order to allow maximum data rates over the forward link throughout the entire network. On the reverse frequency return link, a radiotelephone may be limited to a maximum of 5 slots per frame, which can be adequate for the return link. Whether the five available time slots per frame, on a reverse frequency return link carrier, are assigned to one radiotelephone or to five different radiotelephones, they can be assigned contiguously in these embodiments. As was described in connection with FIG. 12, these five contiguous slots can be assigned to high-power users while the remaining three slots may be used to serve low-power users.

Other embodiments may be based on operating the ATC entirely in reverse frequency mode compared to the SBC. In these embodiments, an ATC transmits over the satellite return link frequencies while radiotelephones respond over the satellite forward link frequencies. If sufficient contiguous spectrum exists to support CDMA technologies, and in particular the emerging Wideband-CDMA 3G standard, the ATC forward link can be based on Wideband-CDMA to increase or maximize data throughput capabilities. Interference with GPS may not be an issue since the ATCs transmit over the satellite return link in these embodiments. Instead, interference may become a concern for the radiotelephones. Based, however, on embodiments of FIGS. 11-12, the radiotelephones can be configured to transmit GSM since ATC return link rates are expected, in any event, to be lower than those of the forward link. Accordingly, the ATC return link may employ GPRS-based data modes, possibly even EDGE. Thus, return link carriers that fall within a predetermined frequency interval from the GPS band-edge of 1559 MHz, can be under loaded, per embodiments of FIG. 11 or 12, to satisfy GPS interference concerns.

Finally, other embodiments may use a partial or total reverse frequency mode and may use CDMA on both forward and return links. In these embodiments, the ATC forward link to the radiotelephones utilizes the frequencies of the satellite return link (1626.5 MHz to 1660.5 MHz) whereas the ATC return link from the radiotelephones uses the frequencies of the satellite forward link (1525 MHz to 1559 MHz). The ATC forward link can be based on an existing or developing CDMA technology (e.g., IS-95, Wideband-CDMA, etc.). The ATC network return link can also be based on an existing or developing CDMA technology provided that the radiotelephone's output is gated to cease transmissions for approximately 3 msec once every T msec. In some embodiments, T will be greater than or equal to 6 msec.

This gating may not be needed for ATC return link carriers at approximately 1550 MHz or below. This gating can reduce or minimize out-of-band interference (desensitization) effects for GPS receivers in the vicinity of an ATC. To increase the benefit to GPS, the gating between all radiotelephones over an entire ATC service area can be substantially synchronized. Additional benefit to GPS may be derived from system-wide synchronization of gating. The ATCs can instruct all active radiotelephones regarding the gating epoch. All ATCs can be mutually synchronized via GPS.

Figure 13:
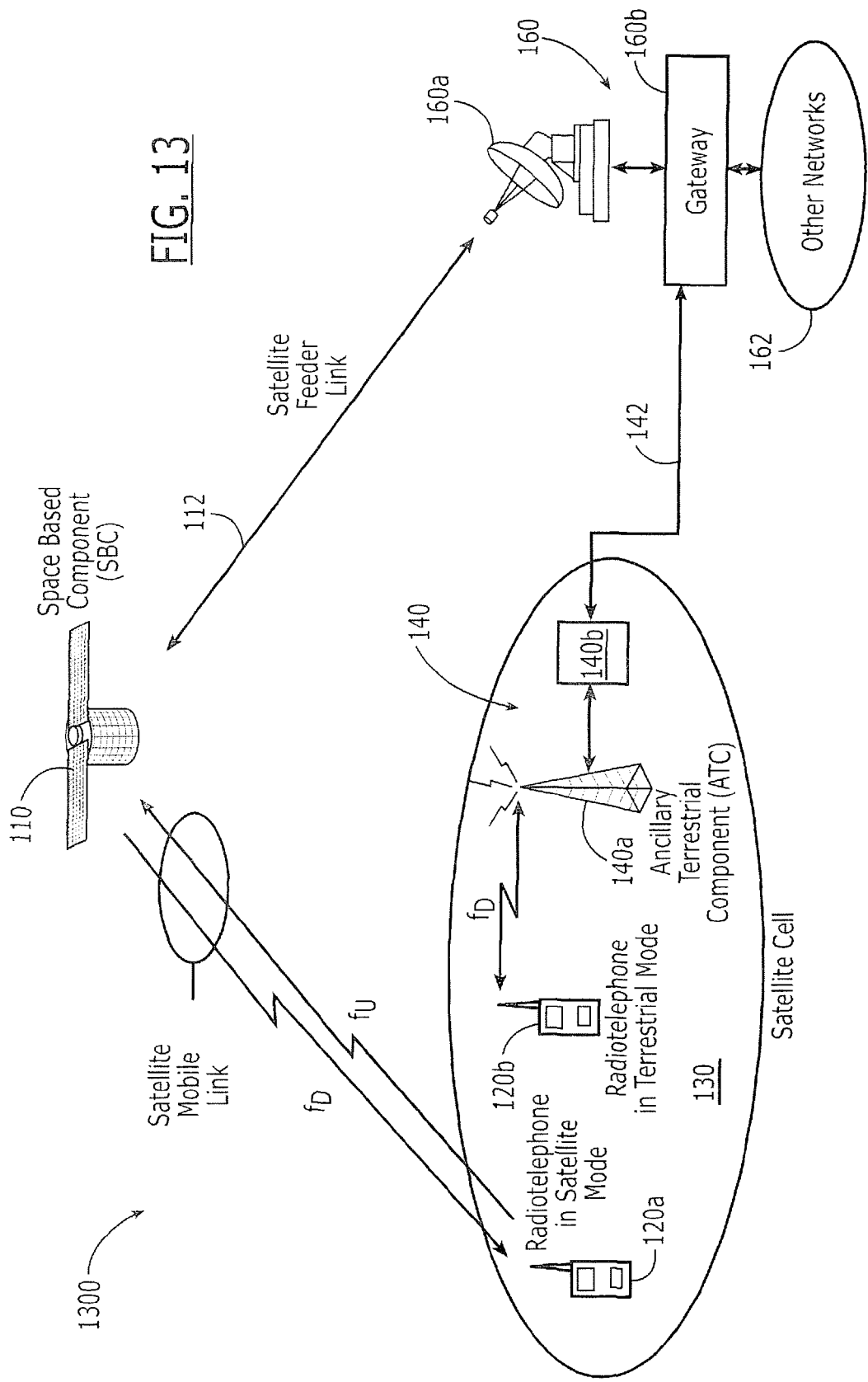
FIG. 13 is a schematic diagram of cellular satellite systems and methods according to other embodiments of the present invention.

Terrestrial Reuse of Cellular Satellite Frequency Spectrum in Time-Division Duplex Mode FIG. 13 is a schematic diagram of cellular satellite systems and methods according to other embodiments of the present invention, in which a downlink satellite radiotelephone frequency or frequencies is terrestrially reused by an ancillary terrestrial network in a Time-Division Duplex (TDD) mode. In particular, FIG. 13 illustrates satellite systems and methods 1300 according to some embodiments of the invention, including an ATC 140 communicating with a radiotelephone 120b using a downlink carrier frequency $f_D$ in TDD mode.

More specifically, these satellite radiotelephone systems and methods 1300 include a space-based component 110 that is configured to receive wireless communications from radiotelephones, such as the radiotelephone 120a, in a satellite footprint 130 over an uplink satellite radiotelephone frequency $f_U$ and to transmit wireless communications to the radiotelephones, such as the radiotelephone 120a, over a downlink satellite radiotelephone frequency $f_D$. An ancillary terrestrial network including at least one ancillary terrestrial component 140 is configured to transmit wireless communications to, and receive wireless communications from, the radiotelephones, such as the radiotelephone 120b, over the downlink satellite radiotelephone frequency $f_D$ in a time-division duplex mode.

These embodiments of the invention may arise from a recognition that if a downlink satellite radiotelephone frequency $f_D$ is reused terrestrially in time-division duplex mode, bidirectional communications between the ATC 140 and the radiotelephones 120 may be provided without generating a potential interference path with space-based communications at the satellite 110 and/or the gateway 160. Stated differently, comparing FIGS. 4 and 13, the potential interference path 150 of FIG. 4 can be reduced and, in some embodiments, eliminated, by using the downlink satellite radiotelephone frequency $f_D$ for time-division duplex communications between the ATC 140 and the radiotelephones 120.

In other embodiments of the present invention, the ancillary terrestrial network also may be configured to transmit wireless communications to, and receive wireless communications from, the radiotelephones over the uplink satellite radiotelephone frequency $f_U$ in a time-division duplex mode, as was already described in FIG. 4. Thus, some embodiments of the present invention can combine FIGS. 4 and 13 for time-division duplex terrestrial reuse of uplink and downlink satellite radiotelephone frequencies. Other embodiments of the invention may also provided space-based communications with the radiotelephones using the uplink satellite radiotelephone frequency $f_U$ and/or the downlink satellite radiotelephone frequency $f_D$ in a time-division duplex mode.

Various embodiments of TDD modes may be provided according to embodiments of the present invention, similar to the modes which were already described in connection with FIG. 4. In some embodiments, the time-division duplex mode includes a frame, for example as was described in FIG. 5, including a plurality of slots. At least a first one of the slots is used to transmit wireless communications to the radiotelephones over the downlink satellite radiotelephone frequency $f_D$, and at least one of the slots is used to receive wireless communications from the radiotelephones over the downlink satellite radiotelephone frequency $f_D$.

In still other embodiments, more than one downlink satellite radiotelephone carrier frequency $f_D$ may be used in a TDD mode. Thus, in some embodiments, the entire downlink radiotelephone frequency band may be used to transmit wireless communications to, and receive wireless communications from, the radiotelephones in a time-division duplex mode. A portion of the downlink radiotelephone frequency band also may be used in TDD mode in other embodiments of the present invention.

Moreover, as also was described in connection with FIG. 4 above, during data communications or other applications, the downlink may use transmissions at higher rates than the uplink. Hence, other embodiments of the present invention may be configured to enable asymmetrical use of the time slots, to provide a higher downlink data rate to the radiotelephones. Thus, as was described above in connection with FIG. 4, a first number of the slots may be used to transmit wireless communications to the radiotelephones over the downlink satellite radiotelephone frequency, and a second number of the slots may be used to receive wireless communications from the radiotelephones over the downlink satellite radiotelephone frequency, wherein the first number is greater than the second number. In other embodiments, at least a first one of the slots is used to transmit wireless communications to the radiotelephones over the downlink satellite radiotelephone frequency using EDGE modulation and/or protocol, and at least a second one of the slots is used to receive wireless communications from the radiotelephones over the downlink satellite radiotelephone frequency using GPRS modulation and/or protocol. Moreover, in other embodiments, at least a first one of the slots is used to transmit wireless communications to the radiotelephones over the downlink satellite radiotelephone frequency using a first modulation and/or protocol, and at least a second one of the slots is used to receive wireless communications from the radiotelephones over the downlink satellite radiotelephone frequency using a second modulation and/or protocol, wherein the first modulation and/or protocol is more spectrally efficient than the second modulation and/or protocol.

Accordingly, embodiments of the present invention can terrestrially reuse some or all of the downlink satellite radiotelephone frequencies in a time-division duplex mode, to reduce or eliminate interference by the radiotelephones and/or ancillary terrestrial components, with space-based communications at the satellite and/or satellite gateway. An interference reducer may not need to be employed in some embodiments of the present invention, because the frequencies generated by the radiotelephones and/or the ATCs may only be satellite radiotelephone downlink frequencies.

Figure 14:
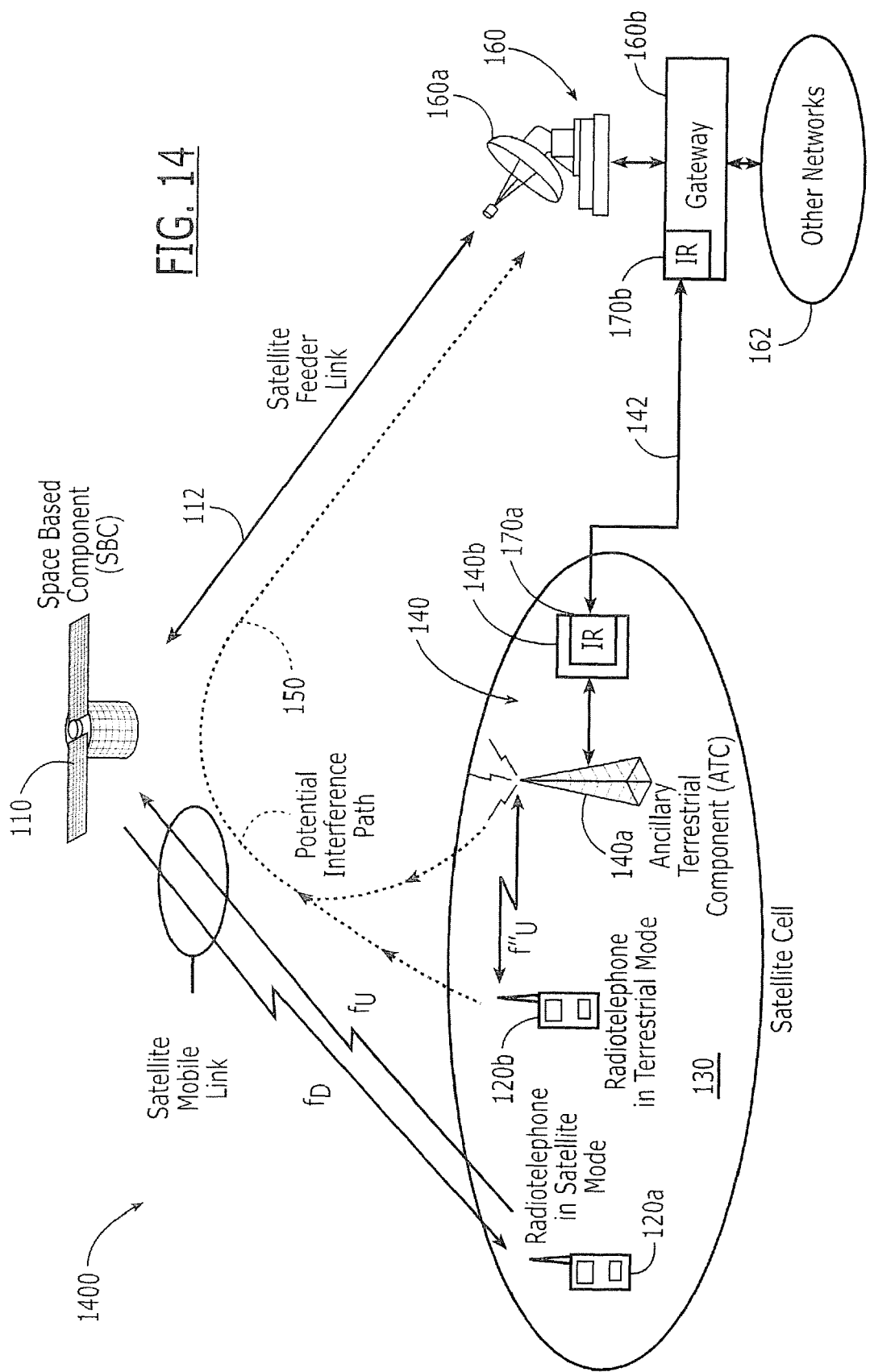
FIG. 14 is a schematic diagram of cellular satellite systems and methods according to other embodiments of the present invention.

Terrestrial Reuse of Cellular Satellite Uplink Frequency Spectrum in Time-Division Duplex (TDD) Mode and Terrestrial Reuse of Cellular Satellite Frequency Spectrum in Frequency Division Duplex (FDD) Non-TDD Mode FIG. 14 is a schematic diagram of cellular satellite systems and methods according to other embodiments of the present invention in which an uplink satellite radiotelephone frequency or frequencies is terrestrially reused by an ancillary terrestrial network in TDD mode. In particular, FIG. 14 illustrates satellite systems and methods 1400 according to some embodiments of the invention, including an ATC 140 communicating with a radiotelephone 120b using an uplink carrier frequency $f_U$ in the TDD mode even within the same satellite cell that is also using the uplink carrier frequency $f_U$ for satellite communications. It will be understood, however, that in addition to ATC 140 that is communicating with radiotelephone 120b, as illustrated in FIG. 14, using the uplink carrier frequency $f_U$ in the TDD mode within the same satellite cell that is also using the uplink carrier frequency $f_U$ for satellite communications, one or more other ancillary terrestrial components (not shown in FIG. 14) may also be using the uplink carrier frequency $f_U$ in the TDD mode outside of satellite cell 130 and inside of other proximate and/or distant to satellite cell 130 satellite cells (not shown in FIG. 14) to communicate with radioterminals that are outside of satellite cell 130 and inside of other, proximate and/or distant to satellite cell 130 satellite cells that may or may not be using the uplink carrier frequency $f_U$ for satellite communications.

In embodiments of FIG. 14, the uplink carrier frequency $f_U$ that is radiated by the radiotelephone 120b and/or by the ATC 140 may contribute to a potential interference path 150. Accordingly, an interference reducer 170a and/or 170b, as was described in connection with FIG. 1, may be used to at least partially reduce the interference.

As shown in FIG. 14, the Interference Reducer (IR) 170a may be provided at least partially in the ancillary terrestrial component electronics system 140b. Alternatively or additionally, an interference reducer 170b may be provided at least partially in the gateway electronics system 160b. In yet other alternatives, the interference reducer may be provided at least partially in other components of the cellular satellite system/method 1400 instead of or in addition to the interference reducer 170a and/or 170b. The interference reducer is responsive to the space-based component 110 and to the ancillary terrestrial component 140, and is configured to reduce the interference from the wireless communications that are received by the space-based component 110 that are generated by the second radiotelephone 120b and/or by the ancillary terrestrial component 140 in the satellite radiotelephone cell 130 over the satellite radiotelephone frequency $f_U$. The interference reducer 170a and/or 170b uses a measure of the wireless communications $f_U$ that are intended for the ancillary terrestrial component 140 from the second radiotelephone 120b and/or a measure of the wireless communications $f_U$ that are intended for the second radiotelephone 120b from the ancillary terrestrial component 140 to reduce the interference in the wireless communications that are received by the space-based component 110 in the satellite radiotelephone cell 130 and/or in any other satellite radiotelephone cell using the satellite radiotelephone frequency $f_U$.

In embodiments of the invention, as shown in FIG. 14, the ancillary terrestrial component 140 generally is closer to the first and second radiotelephones 120a and 120b, respectively, than is the space-based component 110, such that the wireless communications from the second radiotelephone 120b are received by the ancillary terrestrial component 140, and the wireless communications to the second radiotelephone 120b are generated by the ancillary terrestrial component 140, prior to being received by the space-based component 110. The interference reducer 170a and/or 170b are/is configured to generate an interference cancellation signal comprising, for example, at least one delayed replica measure of the wireless communications from the second radiotelephone 120b that are received by the ancillary terrestrial component 140, and/or the wireless communications to the second radiotelephone 120b that are generated by the ancillary terrestrial component 140, and is configured to subtract and/or add a measure of the interference cancellation signal from/to the wireless communications that are received from the space-based component 110. The interference reduction signal (interference cancellation signal) may be transmitted from the ancillary terrestrial component 140 to the gateway 160 over link 142 and/or using other conventional techniques. It will be understood by those having skill in the art that the interference reduction signal (interference cancellation signal) may be de-spread and/or spread, by the interference reducer 170a, 170b and/or by any other system element, by mixing the interference reduction signal (interference cancellation signal) with at least one Pseudo-Noise (PN) de-spreading/spreading (chipping) sequence and/or frequency-hopping sequence prior to using (subtracting and/or adding) a measure of the interference reduction signal to reduce or eliminate an interference from the wireless communications that are received from the space-based component 140.

It will also be understood that the ancillary terrestrial component 140 may communicate bi-directionally and/or uni-directionally with a radiotelephone 120b using any conventional or unconventional protocol and/or air interface standard which may be based on any presently known (or future) multiplexing and/or multiple access technique. It will also be understood that an ensemble of two or more ancillary terrestrial components (ATCs) that are networked comprise an ancillary terrestrial network (ATN). Also, it will be appreciated by those of skill in the art that radiotelephone 120b may be functionally, mechanically, electrically and/or aesthetically identical, substantially identical, or different from radiotelephone 120a. In some embodiments, radiotelephone 120a may be a satellite-only radiotelephone and radiotelephone 120b may be an ATC-only (terrestrial-only) radiotelephone. In other embodiments, radiotelephones 120a and 120b are manufactured identically (within manufacturing/sample tolerances) and are therefore identical in every respect (within manufacturing/sample tolerances).

The TDD mode and/or a non-TDD mode (such as a Frequency Division Duplex (FDD) mode) that may be used by the ancillary terrestrial component 140 to communicate with radiotelephone 120b and/or by radiotelephone 120b to communicate with ancillary component 140 may, in some embodiments, comprise a sequence of transmit/receive frames and/or time intervals whose communications content occupies two or more non-contiguous frequency intervals. This may be accomplished, for example, as described in application Ser. No. 11/006318, entitled "Broadband Wireless Communications Systems and Methods Using Multiple Non-Contiguous Frequency Bands/Segments," filed Dec. 7, 2004, and assigned the assignee of the present invention, the disclosure of which is hereby incorporated herein by reference in its entirety as if set forth fully herein. In some embodiments, the sequence of transmit/receive frames and/or time intervals comprises a sequence of identical transmit/receive frames and/or time intervals. In other embodiments, the sequence of transmit/receive frames and/or time intervals comprises a sequence of non-identical transmit/receive frames and/or time intervals. The time duration, for example, of a first transmit/receive frame and/or time interval may differ from the time duration of a second transmit/receive frame and/or time interval and/or the time allocated to transmit or receive of a first transmit/receive frame and/or time interval may differ from the time allocated to transmit and/or receive of a second transmit/receive frame and/or time interval. In other embodiments, the air interface protocol and/or modulation may differ between transmit/receive frames and/or time intervals and/or between the transmitter and receiver portions (time intervals) of one transmit/receive frame and/or time interval. For example, in some embodiments, at least a first portion and/or a first number of slots of a transmit/receive frame and/or time interval is used to transmit wireless communications to at least one radiotelephone over the uplink satellite radiotelephone frequency using a first modulation and/or protocol such as Orthogonal Frequency Division Multiplexed (OFDM) with M-ary Quadrature Amplitude Modulation (M-ary QAM). At least a second portion and/or a second number of slots of a transmit/receive frame is used to receive wireless communications from at least one radiotelephone over the uplink satellite radiotelephone frequency using a second modulation and/or protocol, such as Orthogonal Frequency Division Multiple Access (OFDMA) with L-ary Quadrature Amplitude Modulation (L-ary QAM), that may be less spectrally efficient than the first modulation and/or protocol ($L \leq M$). In some embodiments, the value of M and/or L (the size of the corresponding QAM alphabet) is $\geq 1$.

Thus, adaptive interference reduction techniques may be used to at least partially cancel the interfering signal, so that the same, and/or other proximate and/or distant, satellite radiotelephone uplink frequency can be used in a given and/or other geographically proximate and/or distant satellite cell(s) for communications by radiotelephones 120 with the satellite 110 and/or with the ancillary terrestrial component 140.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A satellite radiotelephone system comprising:
a space-based component that is configured to communicate with radiotelephones; and
a wireless terrestrial network that is configured to transmit wireless communications to a radiotelephone over an uplink satellite radiotelephone frequency and to receive wireless communications from the radiotelephone over the uplink satellite radiotelephone frequency;
wherein the wireless terrestrial network is further configured to communicate with the radiotelephone in a time-division duplex mode, wherein a first time interval is used to transmit wireless communications to the radiotelephone over the uplink satellite radiotelephone frequency and wherein a second time interval, that does not overlap with the first time interval, is used to receive wireless communications from the radiotelephone over the uplink satellite radiotelephone frequency.

2. A satellite radiotelephone system according to claim 1 wherein the first time interval is greater than the second time interval.

3. A satellite radiotelephone system according to claim 1 wherein the first time interval is used to transmit wireless communications to the radiotelephone over the uplink satellite radiotelephone frequency using an OFDM/OFDMA and/or M-ary QAM modulation/protocol; the second time interval is used to receive wireless communications from the radiotelephone over the uplink satellite radiotelephone frequency using an OFDM/OFDMA and/or L-ary QAM modulation/protocol; and wherein $L \leq M$, and each one of L and M is an integer that is greater than or equal to one.

4. A satellite radiotelephone system according to claim 1 wherein the first time interval is used to transmit wireless communications to the radiotelephone over the uplink satellite radiotelephone frequency using a first modulation and/or protocol and wherein the second time interval is used to receive wireless communications from the radiotelephone over the uplink satellite radiotelephone frequency using a second modulation and/or protocol, wherein the first modulation and/or protocol is more spectrally efficient than the second modulation and/or protocol.

5. A satellite radiotelephone system according to claim 1 wherein the time-division duplex mode contains a sequence of transmit/receive intervals and wherein a first transmit/receive interval is different from a second transmit/receive interval.

6. A satellite radiotelephone system according to claim 5 wherein the first transmit/receive interval is different from the second transmit/receive interval in a modulation, protocol and/or time duration thereof 7. A satellite radiotelephone system according to claim 1 wherein the time-division duplex mode contains a sequence of transmit/receive intervals and wherein a first transmit/receive interval is the same or substantially the same to a second transmit/receive interval in a modulation, protocol, and/or time duration thereof.

8. A satellite radiotelephone system according to claim 1 wherein the time-division duplex mode contains a sequence of identical or substantially identical transmit/receive intervals in terms of a modulation, protocol and/or time duration thereof.

9. A satellite radiotelephone system comprising:
a space-based component that is configured to communicate with radiotelephones; and
a wireless terrestrial network that is configured to transmit wireless communications to a radiotelephone over an uplink satellite radiotelephone frequency and to receive wireless communications from the radiotelephone over the uplink satellite radiotelephone frequency;
wherein the uplink satellite radiotelephone frequency is included in an uplink satellite radiotelephone frequency band and wherein the wireless terrestrial network is configured to transmit wireless communications to, and receive wireless communications from, radiotelephones over the uplink satellite radiotelephone frequency band.

10. A satellite radiotelephone system comprising:
a space-based component that is configured to communicate with radiotelephones; and
a wireless terrestrial network that is configured to transmit wireless communications to a radiotelephone over an uplink satellite radiotelephone frequency and to receive wireless communications from the radiotelephone over the uplink satellite radiotelephone frequency;
wherein the space-based component is configured to receive wireless communications from a first radiotelephone over an uplink satellite radiotelephone frequency band;
wherein the wireless terrestrial network is configured to transmit wireless communications to, and/or receive wireless communications from, a second radiotelephone over the uplink satellite radiotelephone frequency, the space-based component also receiving the wireless communications from the second radiotelephone and/or from the wireless terrestrial network over the uplink satellite radiotelephone frequency as interference along with the wireless communications from the first radiotelephone; and
wherein the satellite radiotelephone system further comprises an interference reducer that is responsive to the space-based component and to the wireless terrestrial network, and that is configured to reduce the interference that is received by the space-based component from the second radiotelephone and/or from the wireless terrestrial network over the uplink satellite radiotelephone frequency, using the wireless communications that are transmitted by the wireless terrestrial network to, and/or are received by the wireless terrestrial network from, the second radiotelephone over the uplink satellite radiotelephone frequency.

11. A satellite radiotelephone system according to claim 10 wherein the wireless terrestrial network is further configured to provide to the interference reducer a signal comprising the wireless communications that are transmitted by the wireless terrestrial network to the second radiotelephone and/or the wireless communications that are received by the wireless terrestrial network from the second radiotelephone; and wherein the interference reducer is configured to generate at least one delayed replica of said signal and to subtract a measure of the at least one delayed replica of said signal from wireless communications that are provided to the interference reducer by the space-based component.

12. A satellite radiotelephone system according to claim 10 wherein the interference reducer comprises an adaptive interference reducer.

13. A satellite radiotelephone system according to claim 10 further comprising a gateway that communicates with the space-based component and with the wireless terrestrial network and wherein the interference reducer is at least partially included in the gateway.

14. A satellite radiotelephone system according to claim 10 wherein the interference reducer is at least partially included in the wireless terrestrial network.

15. A wireless terrestrial component that is associated with a satellite radiotelephone system that includes a space-based component that is configured to communicate with radiotelephones, the wireless terrestrial component comprising:
an electronics system that is configured to transmit wireless communications to a radiotelephone over an uplink satellite radiotelephone frequency and to receive wireless communications from the radiotelephone over the uplink satellite radiotelephone frequency;
wherein the electronics system is further configured to communicate with the radiotelephone in a time-division duplex mode wherein a first time interval is used to transmit wireless communications to the radiotelephone over the uplink satellite radiotelephone frequency and wherein a second time interval, that does not overlap with the first time interval, is used to receive wireless communications from the radiotelephone over the uplink satellite radiotelephone frequency.

16. A wireless terrestrial component according to claim 15 wherein the first time interval is greater than the second time interval.

17. A wireless terrestrial component according to claim 15 wherein the first time interval is used to transmit wireless communications to the radiotelephone over the uplink satellite radiotelephone frequency using an OFDM/OFDMA and/or M-ary QAM modulation/protocol; the second time interval is used to receive wireless communications from the radiotelephone over the uplink satellite radiotelephone frequency using an OFDM/OFDMA and/or L-ary QAM modulation/protocol; and wherein L≦M, and each one of M and L is an integer that is greater than or equal to one.

18. A wireless terrestrial component according to claim 15 wherein the first time interval is used to transmit wireless communications to the radiotelephone over the uplink satellite radiotelephone frequency using a first modulation and/or protocol and wherein the second time interval is used to receive wireless communications from the radiotelephone over the uplink satellite radiotelephone frequency using a second modulation and/or protocol, wherein the first modulation and/or protocol is more spectrally efficient than the second modulation and/or protocol.

19. A wireless terrestrial component that is associated with a satellite radiotelephone system that includes a space-based component that is configured to communicate with radiotelephones, the wireless terrestrial component comprising:
an electronics system that is configured to transmit wireless communications to a radiotelephone over an uplink satellite radiotelephone frequency and to receive wireless communications from the radiotelephone over the uplink satellite radiotelephone frequency;

wherein the uplink satellite radiotelephone frequency is included in an uplink satellite radiotelephone frequency band and wherein the electronics system is further configured to transmit wireless communications to, and receive wireless communications from, radiotelephones over the uplink satellite radiotelephone frequency band.

20. A wireless terrestrial component that is associated with a satellite radiotelephone system that includes a space-based component that is configured to communicate with radiotelephones, the wireless terrestrial component comprising:

an electronics system that is configured to transmit wireless communications to a radiotelephone over an uplink satellite radiotelephone frequency and to receive wireless communications from the radiotelephone over the uplink satellite radiotelephone frequency;

wherein the space-based component is configured to receive wireless communications from a first radiotelephone;

wherein the wireless terrestrial component is configured to transmit wireless communications to, and/or receive wireless communications from, a second radiotelephone over the uplink satellite radiotelephone frequency, the space-based component also receiving the wireless communications from the second radiotelephone and/or from the wireless terrestrial component over the uplink satellite radiotelephone frequency as interference along with the wireless communications from the first radiotelephone; and wherein the wireless terrestrial component and/or the satellite radiotelephone system further comprises an interference reducer that is responsive to the space-based component and to the wireless terrestrial component, and that is configured to reduce the interference that is received by the space-based component from the second radiotelephone and/or from the wireless terrestrial component over the uplink satellite radiotelephone frequency, using the wireless communications that are transmitted by the wireless terrestrial component to, and/or are received by the wireless terrestrial component from, the second radiotelephone over the uplink satellite radiotelephone frequency.

21. A wireless terrestrial component according to claim 20:
wherein the wireless terrestrial component is further configured to transmit to a satellite gateway, a measure of the wireless communications that are transmitted to, and/or a measure of the wireless communications that are received from, the second radiotelephone.

22. A wireless terrestrial component according to claim 20: wherein the wireless terrestrial component further comprises the interference reducer, at least partially.

23. A wireless terrestrial component according to claim 20: wherein the wireless terrestrial component is further configured to provide to the interference reducer a signal comprising the wireless communications that are transmitted by the wireless terrestrial component to the second radiotelephone and/or the wireless communications that are received by the wireless terrestrial component from the second radiotelephone; and wherein the interference reducer is configured to generate at least one delayed replica of said signal and to subtract a measure of the at least one delayed replica of said signal from wireless communications that are provided to the interference reducer by the space-based component.

24. A wireless terrestrial component according to claim 20 wherein the interference reducer comprises an adaptive interference reducer.

25. A radiotelephone comprising:

an electronics system that is configured to transmit wireless communications to a wireless terrestrial component over an uplink satellite radiotelephone frequency and to receive wireless communications from the wireless terrestrial component over the uplink satellite radiotelephone frequency;

wherein the electronics system is further configured to communicate with the wireless terrestrial component in a time-division duplex mode wherein a first time interval is used to transmit wireless communications to the wireless terrestrial component over the uplink satellite radiotelephone frequency and wherein a second time interval, that does not overlap with the first time interval, is used to receive wireless communications from the wireless terrestrial component over the uplink satellite radiotelephone frequency.

26. A radiotelephone according to claim 25 wherein the second time interval is greater than the first time interval.

27. A radiotelephone according to claim 25 wherein the second time interval is used to receive wireless communications at the radiotelephone over the uplink satellite radiotelephone frequency using an OFDM/OFDMA and/or M-ary QAM modulation/protocol; the first time interval is used to transmit wireless communications by the radiotelephone over the uplink satellite radiotelephone frequency using an OFDM/OFDMA and/or L-ary QAM modulation/protocol; and wherein $L \leq M$, and each one of L and M is an integer that is greater than or equal to one.

28. A radiotelephone according to claim 25 wherein the second time interval is used to receive wireless communications at the radiotelephone over the uplink satellite radiotelephone frequency using a respective second modulation and/or protocol and wherein the first time interval is used to transmit wireless communications by the radiotelephone over the uplink satellite radiotelephone frequency using a respective first modulation and/or protocol, wherein the respective second modulation and/or protocol is more spectrally efficient than the respective first modulation and/or protocol.

29. A radiotelephone comprising:

an electronics system that is configured to transmit wireless communications to a wireless terrestrial component over an uplink satellite radiotelephone frequency and to receive wireless communications from the wireless terrestrial component over the uplink satellite radiotelephone frequency;

wherein the uplink satellite radiotelephone frequency is included in an uplink satellite radiotelephone frequency band and wherein the electronics system also is configured to transmit wireless communications to, and receive wireless communications from, the wireless terrestrial component over the uplink satellite radiotelephone frequency band.

30. A radiotelephone comprising:

an electronics system that is configured to transmit wireless communications to a wireless terrestrial component over an uplink satellite radiotelephone frequency and to receive wireless communications from the wireless terrestrial component over the uplink satellite radiotelephone frequency;

wherein the electronics system is further configured to transmit wireless communications to a space-based component over an uplink satellite radiotelephone frequency band and/or to receive wireless communications from the space-based component over a downlink satellite radiotelephone frequency band.

31. A radiotelephone according to claim 30 wherein the electronics system is further configured to transmit wireless communications to a space-based component over an uplink satellite radiotelephone frequency band and/or to receive wireless communications from the space-based component over a downlink satellite radiotelephone frequency band.

32. A wireless communications method comprising:
communicating between a space-based component and radiotelephones; and
transmitting wireless communications from a wireless terrestrial network to a radiotelephone over an uplink satellite radiotelephone frequency and receiving wireless communications from the radiotelephone at the wireless terrestrial network over the uplink satellite radiotelephone frequency;
wherein communicating between a space-based component and radiotelephones comprises receiving at the space-based component communications from a first radiotelephone;
wherein transmitting wireless communications from a wireless terrestrial network to a radiotelephone over an uplink satellite radiotelephone frequency and receiving wireless communications from the radiotelephone at the wireless terrestrial network over the uplink satellite radiotelephone frequency comprises transmitting wireless communications from the wireless terrestrial network to a second radiotelephone over the uplink satellite radiotelephone frequency and receiving wireless communications from the second radiotelephone at the wireless terrestrial network over the uplink satellite radiotelephone frequency, the space-based component also receiving the wireless communications that are transmitted from the wireless terrestrial network to the second radiotelephone and/or the wireless communications that are received at the wireless terrestrial network from the second radiotelephone over the uplink satellite radiotelephone frequency as interference; and
wherein the method further comprises reducing said interference by using the wireless communications that are transmitted from the wireless terrestrial network to, and/or are received by the wireless terrestrial network from, the second radiotelephone.

33. A method according to claim 32 wherein reducing said interference comprises:
generating at least one delayed replica of the wireless communications that are received at the wireless terrestrial network from the second radiotelephone and/or of the wireless communications that are transmitted from the wireless terrestrial network to the second radiotelephone; and
subtracting a measure of said at least one delayed replica from the wireless communications that are received by the space-based component.

34. A method of operating a wireless terrestrial component that is associated with a satellite radiotelephone system that includes a space-based component that is configured to communicate with radiotelephones; the method comprising:
transmitting wireless communications to a radiotelephone over an uplink satellite radiotelephone frequency and receiving wireless communications from the radiotelephone over the uplink satellite radiotelephone frequency;
wherein the space-based component is configured to receive wireless communications from a first radiotelephone;
wherein the wireless terrestrial component is configured to transmit wireless communications to, and/or receive wireless communications from, a second radiotelephone over the uplink satellite radiotelephone frequency, the space-based component also receiving the wireless communications from the second radiotelephone and/or from the wireless terrestrial component as interference along with the wireless communications that are received from the first radiotelephone; and
wherein the method further comprises reducing interference that is received by the space-based component from the second radiotelephone and/or from the wireless terrestrial component over the uplink satellite radiotelephone frequency, using the wireless communications that are transmitted by the wireless terrestrial component to, and/or are received by the wireless terrestrial component from, the second radiotelephone over the uplink satellite radiotelephone frequency.

35. A method according to claim 34 further comprising:
transmitting from the wireless terrestrial component to a satellite gateway, a measure of the wireless communications that are transmitted to, and/or a measure of the wireless communications that are received from, the second radiotelephone.

36. A method according to claim 35 wherein reducing interference comprises:
reducing the interference at the satellite gateway.

37. A method according to claim 36 wherein reducing interference comprises:
generating at least one delayed replica of the wireless communications that are received by the wireless terrestrial component from the second radiotelephone and/or of the wireless communications that are transmitted by the wireless terrestrial component to the second radiotelephone; and
subtracting a measure of the at least one delayed replica from the wireless communications that are received by the space-based component.

38. A method of operating a gateway that is associated with a satellite radiotelephone system that includes a space-based component that is configured to receive wireless communications from radiotelephones; wherein the gateway is also associated with a wireless terrestrial network that is configured to transmit wireless communications to, and/or receive wireless communications from, a radiotelephone over an uplink satellite radiotelephone frequency; the method comprising:
receiving from the space-based component wireless communications; and
receiving from the wireless terrestrial network wireless communications that are transmitted to and/or are received from the radiotelephone over the uplink satellite radiotelephone frequency.

39. A method according to claim 38:
wherein the space-based component is configured to receive wireless communications from a first radiotelephone;
wherein the wireless terrestrial network is configured to transmit wireless communications to, and receive wireless communications from, a second radiotelephone over the uplink satellite radiotelephone frequency, the space-based component also receiving the wireless communications from the second radiotelephone and/or the wireless communications from the wireless terrestrial network as interference along with the wireless communications that are received from the first radiotelephone; and
wherein the method further comprises reducing said interference by using the wireless communications that are transmitted by the wireless terrestrial network to, and/or are received by the wireless terrestrial network from, the second radiotelephone over the uplink satellite radiotelephone frequency.

40. A method according to claim 39 wherein reducing interference comprises:

generating at least one delayed replica of the wireless communications that are received by the wireless terrestrial network from the second radiotelephone and/or the wireless communications that are transmitted from the wireless terrestrial network to the second radiotelephone; and subtracting a measure of the at least one delayed replica from the wireless communications that are received by the space-based component.

* * * * *